US010640122B2

(12) United States Patent
Kishi et al.

(10) Patent No.: US 10,640,122 B2
(45) Date of Patent: May 5, 2020

(54) DRIVING CONSCIOUSNESS ESTIMATION DEVICE

(71) Applicants: TOYOTA JIDOSHA KABUSHIKI KAISHA, Toyota-shi, Aichi (JP); NATIONAL INSTITUTE OF ADVANCED INDUSTRIAL SCIENCE AND TECHNOLOGY, Tokyo (JP)

(72) Inventors: Hiroshi Kishi, Toyota (JP); Masakazu Akutsu, Toyota (JP); Motoyuki Akamatsu, Tsukuba (JP); Toshihisa Sato, Tsukuba (JP)

(73) Assignees: TOYOTA JIDOSHA KABUSHIKI KAISHA, Toyota-shi, Aichi (JP); NATIONAL INSTITUTE OF ADVANCED INDUSTRIAL SCIENCE AND TECHNOLOGY, Chiyoda-ku, Tokyo (JP)

( * ) Notice: Subject to any disclaimer, the term of this patent is extended or adjusted under 35 U.S.C. 154(b) by 0 days.

(21) Appl. No.: 15/479,539

(22) Filed: Apr. 5, 2017

(65) Prior Publication Data
US 2017/0313319 A1  Nov. 2, 2017

(30) Foreign Application Priority Data

Apr. 28, 2016  (JP) ................. 2016-091401

(51) Int. Cl.
*B60W 40/08*  (2012.01)
*B60W 50/14*  (2020.01)
(Continued)

(52) U.S. Cl.
CPC ............... *B60W 40/08* (2013.01); *B60R 1/00* (2013.01); *B60W 10/04* (2013.01); *B60W 10/18* (2013.01);
(Continued)

(58) Field of Classification Search
CPC ...... B60W 40/08; B60W 10/04; B60W 10/18; B60W 10/20; B60W 30/08; B60W 50/12;
(Continued)

(56) References Cited

U.S. PATENT DOCUMENTS 5,485,892 A * 1/1996 Fujita ................... B60K 28/066
                                            180/167
5,867,587 A * 2/1999 Aboutalib .............. G08B 21/06
                                            340/576
(Continued)

FOREIGN PATENT DOCUMENTS

EP  2284057 A2  2/2011
EP  2314489 A1  4/2011
(Continued)

*Primary Examiner* — Behrang Badii
*Assistant Examiner* — Daniel L Greene
(74) *Attorney, Agent, or Firm* — Sughrue Mion, PLLC

(57) ABSTRACT

A driving consciousness estimation device includes a driving readiness estimation unit configured to estimate a driving readiness relating to a driving consciousness of the driver from a driver's reaction to the travelling environment, a driving task demand estimation unit configured to estimate a driving task demand which is an index required for the driver with respect to the driving readiness from the travelling environment, and an attention awakening unit configured to execute awakening of attention for the driver relating to the driving of the vehicle based on the result of comparison between the driving readiness and the driving task demand.

8 Claims, 11 Drawing Sheets

(51) Int. Cl.

| | |
|---|---|
| *B60R 1/00* | (2006.01) |
| *B60W 10/04* | (2006.01) |
| *B60W 10/18* | (2012.01) |
| *B60W 10/20* | (2006.01) |
| *B60W 30/08* | (2012.01) |
| *B60W 50/12* | (2012.01) |
| *B60W 50/16* | (2020.01) |
| *G05D 1/00* | (2006.01) |
| *G05D 1/02* | (2020.01) |
| *G06K 9/00* | (2006.01) |
| *G08G 1/16* | (2006.01) |
| *B60N 2/90* | (2018.01) |
| *G01S 19/13* | (2010.01) |

(52) U.S. Cl.
CPC ............ *B60W 10/20* (2013.01); *B60W 30/08* (2013.01); *B60W 50/12* (2013.01); *B60W 50/14* (2013.01); *B60W 50/16* (2013.01); *G05D 1/0061* (2013.01); *G05D 1/0248* (2013.01); *G06K 9/00845* (2013.01); *G08G 1/165* (2013.01); *G08G 1/166* (2013.01); *G08G 1/167* (2013.01); *B60K 2370/149* (2019.05); *B60K 2370/152* (2019.05); *B60K 2370/193* (2019.05); *B60K 2370/21* (2019.05); *B60K 2370/333* (2019.05); *B60K 2370/334* (2019.05); *B60K 2370/77* (2019.05); *B60N 2002/981* (2018.02); *B60R 2300/105* (2013.01); *B60R 2300/107* (2013.01); *B60R 2300/205* (2013.01); *B60R 2300/301* (2013.01); *B60R 2300/302* (2013.01); *B60R 2300/804* (2013.01); *B60R 2300/8006* (2013.01); *B60R 2300/8033* (2013.01); *B60R 2300/8093* (2013.01); *B60W 2040/0818* (2013.01); *B60W 2050/143* (2013.01); *B60W 2050/146* (2013.01); *B60W 2420/42* (2013.01); *B60W 2520/105* (2013.01); *B60W 2520/125* (2013.01); *B60W 2520/14* (2013.01); *B60W 2520/28* (2013.01); *B60W 2540/26* (2013.01); *B60W 2550/143* (2013.01); *B60W 2550/30* (2013.01); *B60W 2550/302* (2013.01); *B60W 2550/308* (2013.01); *B60W 2550/402* (2013.01); *B60W 2720/106* (2013.01); *B60W 2720/125* (2013.01); *B60W 2720/14* (2013.01); *B60W 2720/28* (2013.01); *B60W 2750/302* (2013.01); *B60W 2750/308* (2013.01); *G01S 19/13* (2013.01)

(58) Field of Classification Search
CPC ......... B60W 50/14; B60W 50/16; B60R 1/00; G05D 1/0061; G05D 1/0248; G08G 1/165; G08G 1/166; G08G 1/167
See application file for complete search history.

(56) References Cited

U.S. PATENT DOCUMENTS

| | | | | |
|---|---|---|---|---|
| 6,028,608 | A * | 2/2000 | Jenkins | G06T 1/0021 345/619 |
| 6,091,334 | A * | 7/2000 | Galiana | G08B 21/06 340/439 |
| 6,097,295 | A * | 8/2000 | Griesinger | A61B 5/18 340/576 |
| 7,027,621 | B1 * | 4/2006 | Prokoski | G06K 9/00248 180/272 |
| 7,164,117 | B2 * | 1/2007 | Breed | B60R 21/01516 250/208.1 |
| 7,826,894 | B2 * | 11/2010 | Musallam | A61F 2/68 600/378 |
| 9,248,796 | B2 * | 2/2016 | Takahashi | B60R 21/00 |
| 9,775,554 | B2 * | 10/2017 | Jung | A61B 5/165 |
| 2003/0146841 | A1 | 8/2003 | Koenig | |
| 2003/0209893 | A1 * | 11/2003 | Breed | B60J 10/00 280/735 |
| 2004/0061615 | A1 * | 4/2004 | Takashima | A61B 5/1126 340/575 |
| 2005/0073136 | A1 * | 4/2005 | Larsson | A61B 3/113 280/735 |
| 2008/0185207 | A1 * | 8/2008 | Kondoh | B60W 30/16 180/272 |
| 2008/0188777 | A1 * | 8/2008 | Bedziouk | A61B 3/113 600/595 |
| 2008/0287821 | A1 * | 11/2008 | Jung | G06F 19/3418 600/544 |
| 2009/0198148 | A1 * | 8/2009 | Lonky | A61B 3/113 600/558 |
| 2010/0033333 | A1 * | 2/2010 | Victor | A61B 3/113 340/576 |
| 2012/0072097 | A1 * | 3/2012 | Ohta | B60R 1/00 701/118 |
| 2015/0070160 | A1 * | 3/2015 | Davidsson | B60K 28/06 340/457 |
| 2015/0094907 | A1 | 4/2015 | Offenhaeuser et al. | |
| 2015/0253772 | A1 * | 9/2015 | Solyom | G05D 1/0212 701/25 |
| 2015/0375757 | A1 | 12/2015 | Schiek et al. | |
| 2016/0029940 | A1 | 2/2016 | Lizuka et al. | |
| 2016/0041553 | A1 | 2/2016 | Sato et al. | |
| 2018/0284774 | A1 * | 10/2018 | Kawamoto | B60W 50/10 |

FOREIGN PATENT DOCUMENTS

| | | |
|---|---|---|
| EP | 2848488 A1 | 3/2015 |
| JP | 2004-507308 A | 3/2004 |
| JP | 2007265377 A | 10/2007 |
| JP | 2015-520642 A | 7/2015 |
| JP | 2015207163 A | 11/2015 |
| JP | 2016-015137 A | 1/2016 |
| JP | 2016038768 A | 3/2016 |
| WO | 2010091464 A1 | 8/2010 |
| WO | 2014147828 A1 | 9/2014 |

* cited by examiner

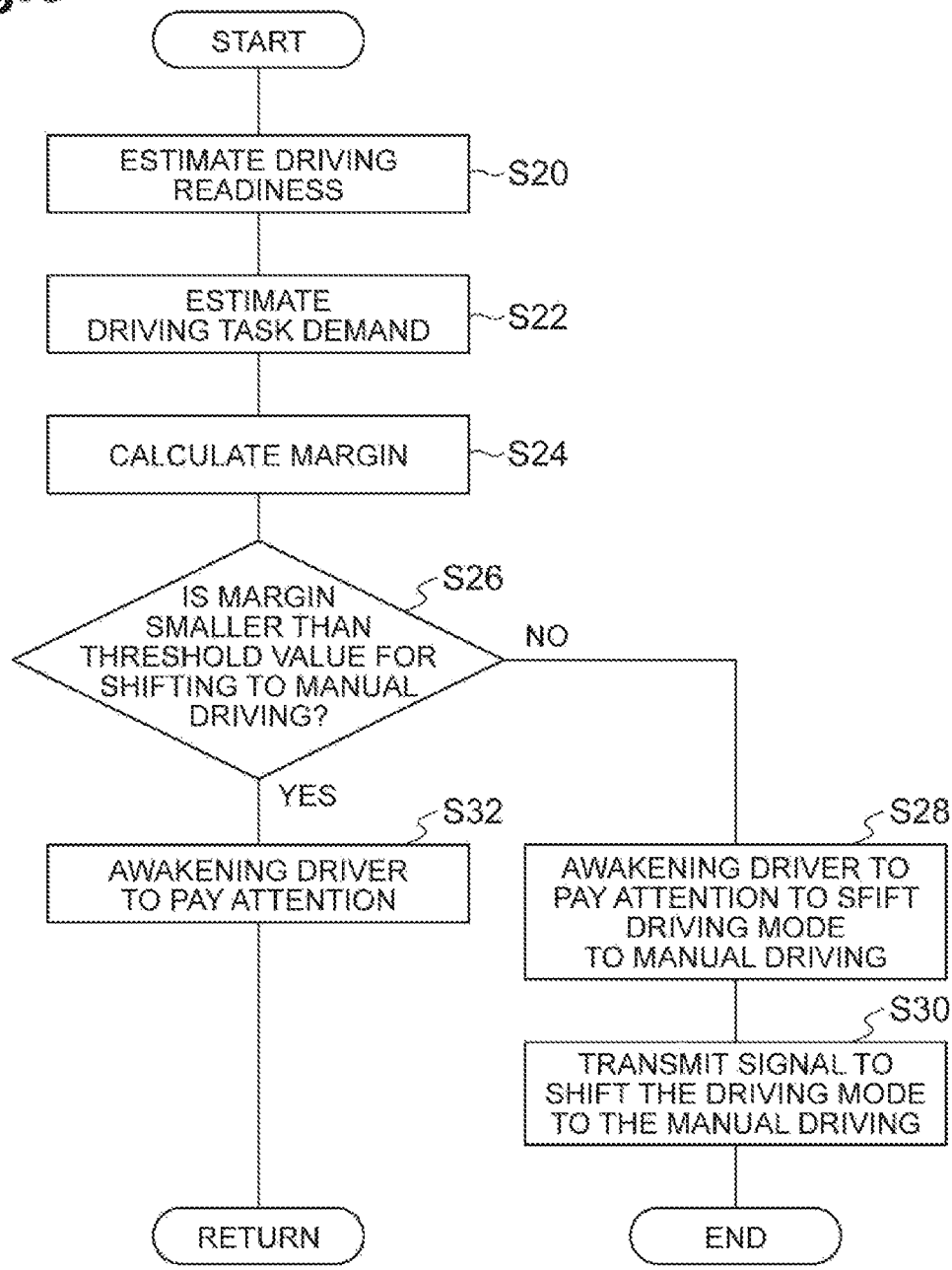

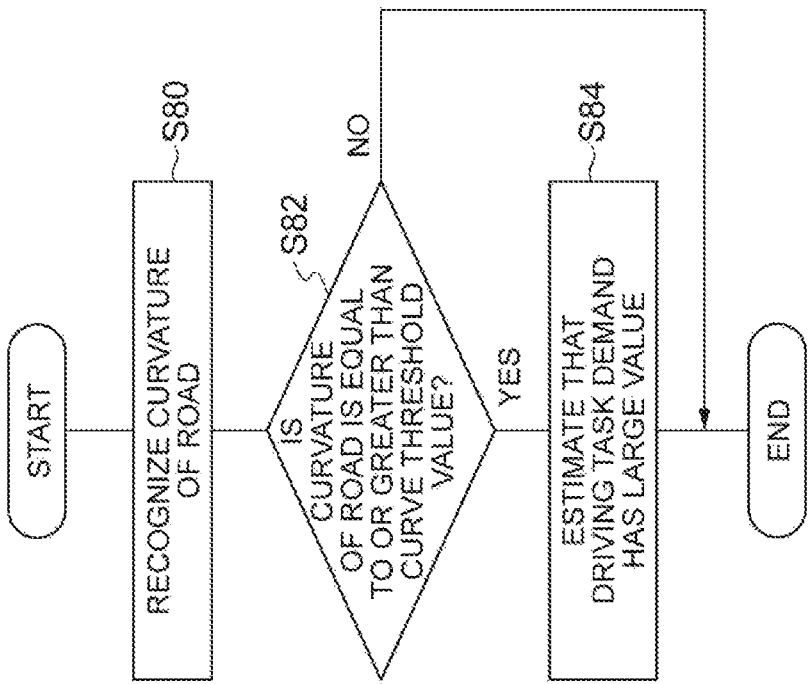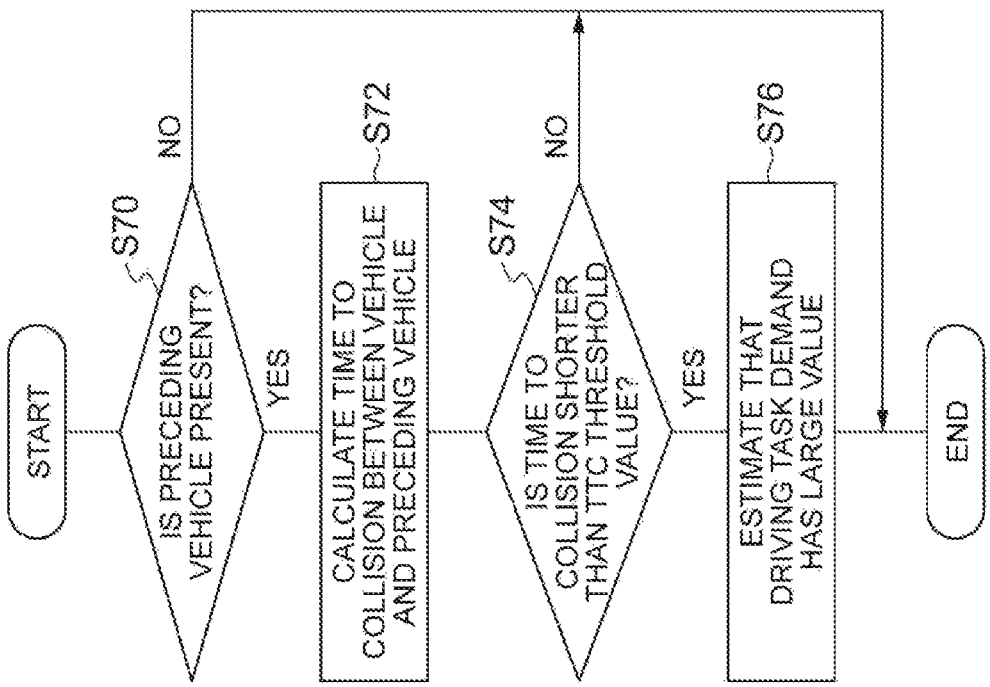

DRIVING CONSCIOUSNESS ESTIMATION DEVICE

TECHNICAL FIELD

The present invention relates to a driving consciousness estimation device.

BACKGROUND

In the related art, Japanese Unexamined Patent Publication No. 2016-15137 is known as a technical literature relating to a system considering a state of a driver. In the literature, an autonomous travelling system for a vehicle is disclosed, which calculates a lead time that is a remaining time for an autonomous travelling to be surely continued and a reaction time for the driver to intervene in the autonomous driving (a countermeasure for a manual driving). In this system, when a comfort time which is a difference between the lead time and the reaction time becomes zero, a countermeasure to the driver such as a warning is performed.

SUMMARY

However, in the system in the related art described above, a driving consciousness of the driver is not appropriately considered. Therefore, in the system in the related art, even when the driving consciousness of the driver is high, if the comfort time becomes zero, a countermeasure such as a warning is performed. Therefore, there is a problem in that the driver may feel uncomfortable. On the other hand, in the system in the related art, even when the driving consciousness of the driver is low, if the comfort time does not become zero, a countermeasure such as a warning is not performed. Therefore, there is a problem in that a delay may occur in performing a countermeasure for a manual driving by the driver.

Therefore, in this technical field, it is desirable to provide a driving consciousness estimation device that can appropriately awaken the driver's attention.

In order to solve the problems described above, a driving consciousness estimation device in an aspect of the present includes a driver image acquisition unit configured to acquire a driver image in which a driver of a vehicle is imaged, a travelling environment recognition unit configured to recognize a travelling environment around the vehicle, a driving readiness estimation unit configured to estimate a driving readiness relating to a driving consciousness of the driver from a driver's reaction to the travelling environment based on the driver image and the travelling environment, a driving task demand estimation unit configured to estimate a driving task demand which is an index required for the driver with respect to the driving readiness from the travelling environment based on the travelling environment, and an attention awakening unit configured to execute awakening of attention for the driver relating to the driving of the vehicle based on the result of comparison between the driving readiness and the driving task demand.

According to the driving consciousness estimation device in an aspect of the present, since it is considered that the reaction of the driver of the vehicle having a high driving consciousness to the travelling environment around the vehicle is different from that of the driver having a low driving consciousness, it is possible to appropriately estimate the driving readiness relating to the driving consciousness of the driver using the driver's reaction to the travelling environment. Therefore, in this driving consciousness estimation device, it is possible to appropriately perform awakening of the driver's attention relating to the driving of the vehicle while considering the driving consciousness of the driver by performing awakening of the attention based on the result of comparison between the appropriately estimated driving readiness and the driving task demand required for the driver due to the travelling environment.

In the driving consciousness estimation device in the aspect described above, the driving readiness estimation unit may be configured to calculate the number of saccades of eye balls per a predetermined time interval during a period when the driver is facing the extending direction of the road on which the vehicle is travelling based on the driver image and the travelling environment, and estimate the driving readiness based on the number of saccades. In this driving consciousness estimation device, since it is considered that the face of the driver having a high driving consciousness is facing the extending direction of the road on which the vehicle is travelling, and the number of saccades of the eye balls increases in order to recognize the situation in the extending direction of the road, it is possible to appropriately estimate the driving readiness based on the number of saccades of the eye balls per a predetermined time interval during the time when the drive is facing the extending direction of the road.

A driving consciousness estimation device in another aspect of the present includes a driver image acquisition unit configured to acquire a driver image in which a driver of a vehicle is imaged, a travelling environment recognition unit configured to recognize a travelling environment around the vehicle, a vehicle state recognition unit configured to recognize a travelling state of the vehicle, a driving readiness estimation unit configured to estimate a driving readiness relating to a driving consciousness of the driver from a driver's reaction to the vehicle state based on the driver image and the vehicle state, a driving task demand estimation unit configured to estimate a driving task demand which is an index required for the driver with respect to the driving readiness from the travelling environment based on the travelling environment, and an attention awakening unit configured to execute awakening of attention for the driver relating to the driving of the vehicle.

According to the driving consciousness estimation device in another aspect of the present, since it is considered that the reaction of the driver of the vehicle having a high driving consciousness to the vehicle state of the vehicle is different from that of the driver having a low driving consciousness, it is possible to appropriately estimate the driving readiness relating to the driving consciousness of the driver using the driver's reaction to the vehicle state. Therefore, in this driving consciousness estimation device, it is possible to appropriately perform awakening of the driver's attention relating to the driving of the vehicle while considering the driving consciousness of the driver by performing awakening of the attention based on the result of comparison between the appropriately estimated driving readiness and the driving task demand required for the driver due to the travelling environment.

In the driving consciousness estimation device in another aspect described above, the vehicle state recognition unit may be configured to recognize a longitudinal acceleration of the vehicle as the vehicle state, and the driving readiness estimation unit may be configured to estimate the driving readiness from a head pitch angle of the driver with respect to the longitudinal acceleration of the vehicle based on the driver image and the longitudinal acceleration of the vehicle. According to this driving consciousness estimation device, since it is considered that the driver having a high driving consciousness takes the driving readiness while predicting a change of the longitudinal acceleration of the vehicle, and thus, the head pitch angle decreases, it is possible to appropriately estimate the driving readiness based on the head pitch angle with respect to the longitudinal acceleration of the vehicle.

The driving consciousness estimation device in an aspect or another aspect described above may further include a margin calculation unit configured to calculate a result of comparison between the driving readiness and the driving task demand as a margin. The attention awakening unit may be configured to execute awakening of the attention in a case where the margin is smaller than a margin threshold value. According to this driving consciousness estimation device, by calculating the result of comparison between the driving readiness and the driving task demand as the margin, it is possible to determine whether or not to execute awakening of the attention using one index.

The driving consciousness estimation device in an aspect or another aspect described above may further include a manual driving possibility determination unit configured to determine whether or not the driver is in a manual driving possible situation based on the result of comparison between the driving readiness and the driving task demand when an autonomous driving ECU of the vehicle ends the autonomous driving. According to this driving consciousness estimation device, since whether or not the driver is in the manual driving possible situation is determined based on the result of comparison between the driving readiness and the driving task demand, it is possible to appropriately determine whether or not the driver is in the manual driving possible situation while considering the driving consciousness of the driver.

Advantageous Effects of the Invention

As described above, according various aspects of the present invention, it is possible to appropriately perform awakening of a driver's attention.

BRIEF DESCRIPTION OF THE DRAWINGS

FIG. 3 is a flowchart illustrating manual driving determination processing in the driving consciousness estimation device.

FIG. 5A is a flowchart illustrating an example of estimating a driving task demand.

FIG. 5B is a flowchart illustrating another example of estimating a driving task demand.

DETAILED DESCRIPTION

Hereinafter, an embodiment of the present invention will be described with reference to the drawings.

Figure 1:
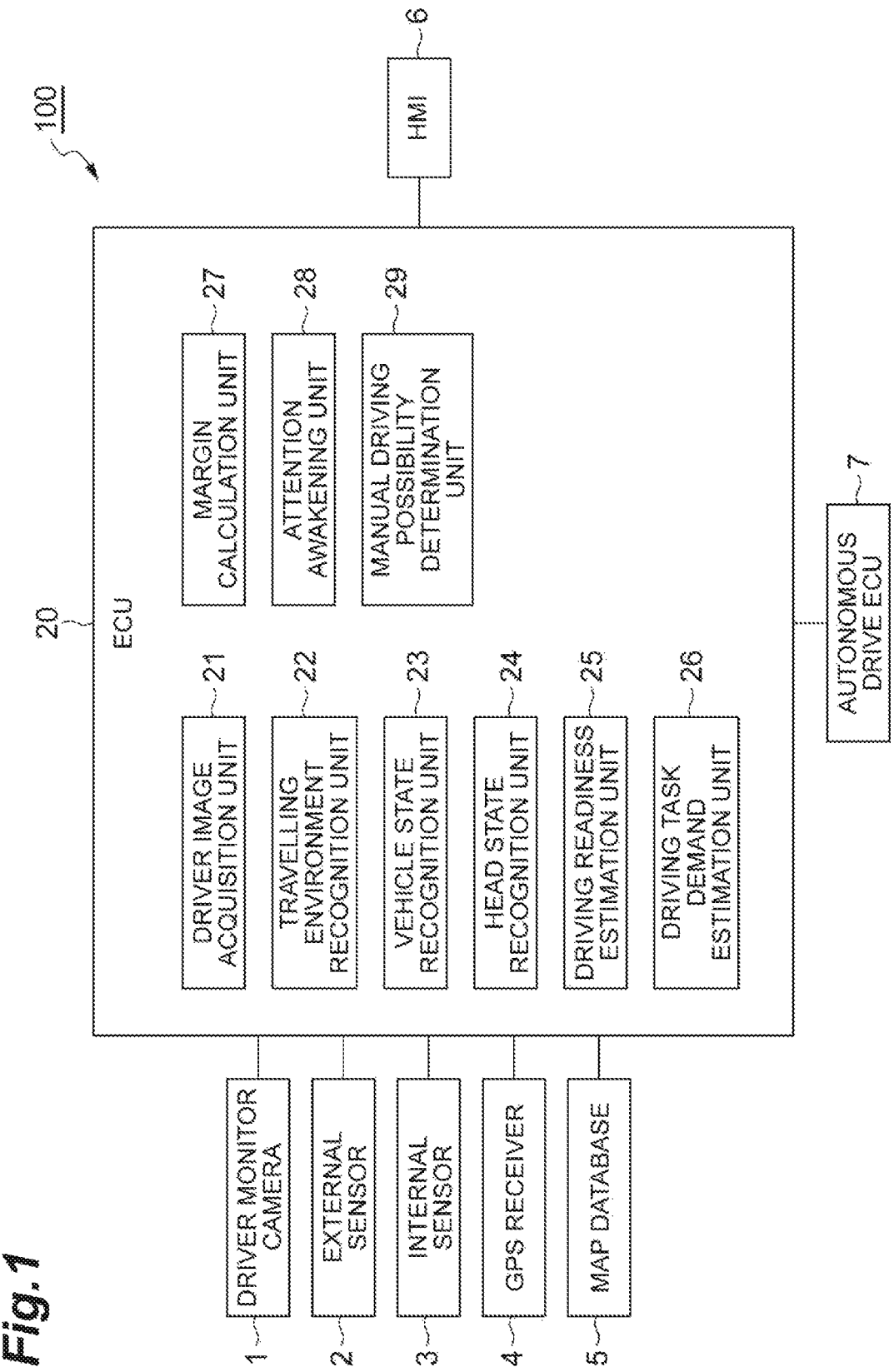
FIG. 1 is a block diagram illustrating a driving consciousness estimation device in a present embodiment.

A driving consciousness estimation device 100 in the present embodiment illustrated in FIG. 1 is device that performs an estimation of a driving readiness of a driver relating to a driving consciousness of the driver. The driving consciousness estimation device 100 performs a determination of a necessity of awakening a driver's attention using the driving readiness. The driving consciousness and the driving readiness will be described below. The driving consciousness estimation device 100 may configure a part of an autonomous driving system that executes an autonomous driving of a vehicle.

[Configuration of the Driving Consciousness Estimation Device]

Hereinafter, a configuration of the driving consciousness estimation device 100 in the present embodiment will be described. As illustrated in FIG. 1, the driving consciousness estimation device 100 includes an electronic control unit (ECU) 20 that generally manages the device.

The ECU 20 is an electronic control unit including a central processing unit (CPU), read only memory (ROM), random access memory (RAM), a controller area network (CAN) communication circuit, and the like. In the ECU 20, various functions are realized by a program stored in the ROM being loaded on the RAM and the CPU executing the program loaded on the RAM. The ECU 20 may be configured to include plural electronic control units.

A driver monitor camera 1, an external sensor 2, an internal sensor 3, a global positioning system (GPS) receiver 4, a map database 5, an HMI 6 are connected to the ECU 20. In addition, the ECU 20 is connected to an autonomous drive ECU 7.

The driver monitor camera 1 is provided on a cover of a steering column of a vehicle and in front of the driver, and images a head of the driver. Since the driver monitor camera 1 images the driver from plural directions, plural number of cameras may be provided. The driver monitor camera it transmits a driver image in which the driver is imaged to the ECU 20.

The external sensor 2 is a detection device that detects a surrounding environment of the vehicle. The external sensor 2 includes a camera, radar, and a laser imaging detection and ranging (LIDAR). The camera is, for example, provided on the inside of windshield of the vehicle and images the front of the vehicle. The camera may be provided on the rear surface or the side surface of the vehicle. The camera transmits image information relating to surroundings of the vehicle to the ECU 20. The camera may be a monocular camera or may be a stereo camera. The stereo camera has two imaging units that are arranged so as to reproduce a binocular parallax.

The internal sensor 3 is a detection device that detects a vehicle state of the vehicle. The internal sensor 3 includes a vehicle speed sensor, accelerator sensor, and a yaw rate sensor. The vehicle speed sensor is a detection device that detects a speed of the vehicle. As the vehicle speed sensor, for example, a wheel speed sensor is used, which is provided on vehicle wheels of the vehicle or on a drive shaft rotating integrally with vehicle wheels, and detects a rotational speed of the vehicle wheels. The vehicle speed sensor transmits the detected vehicle speed information (vehicle wheel speed information) to the ECU 20.

The accelerator sensor is a detection device that detects an acceleration of the vehicle. The accelerator sensor includes, for example, a longitudinal accelerator sensor that detects acceleration in the longitudinal direction of the vehicle and a lateral acceleration that detects a lateral acceleration in the lateral direction of the vehicle. The accelerator sensor transmits, for example, acceleration information of the vehicle to the ECU 20. The yaw rate sensor is a detection device that detects a yaw rate (rotation angular velocity) around the vertical axis at the center of gravity of the vehicle. As the yaw rate sensor, for example, a Gyro sensor can be used. The yaw rate sensor transmits the detected yaw rate information of the vehicle to the ECU 20.

The GPS receiver 4 measures the position of the vehicle (for example, the latitude and longitude of the vehicle) by receiving a signal from three of more UPS satellites. The GPS receiver 4 transmits the measured position information of the vehicle to the ECU 20. The driving consciousness estimation device 100 may acquire the position information of the vehicle using a simultaneous localization and mapping (SLAM) technology which uses the result of detection by the external sensor 2 and map information, instead of the GPS.

The map database 5 is a database storing the map information. The map database 5 is formed, for example, in a hard disk drive (TIDD) mounted on the vehicle. The map information includes information on the position of the road, information on the shape of the road (for example, types of a curve or a straight road, a curvature of the curve, or the like), information on the width of the road, information on the height of the road, information on the position of the intersection and the branch, and information on the position of a building. The map database 5 may be stored in a computer in a facility such as a management center that can communicate with the vehicle.

The HMI 6 is an interface that performs inputting and outputting of the information between the driving consciousness estimation device 100 and the driver. The HMI 6 includes, for example, a display and a speaker of the vehicle. The HMI 6 outputs an image on the display and outputs a voice from the speaker according to a control signal from the ECU 20. The HMI 6 may include a head up display (HUD).

The autonomous drive ECU 7 is an electronic control unit that is mounted on the vehicle and executes an autonomous driving of the vehicle. The autonomous driving means a vehicle control causing the vehicle to travel autonomously without the driving operation by the driver. In the Society of Automotive Engineers (SAE) J3016, autonomous driving level 0 to autonomous driving level 4 are defiled according to the degree of the autonomous driving.

The autonomous drive ECU 7 generates a travel plan along a preset target route based on the position information of the vehicle from the GPS receiver 4, the map information in the map database 5, and a travelling environment and the vehicle state of the vehicle described below. The target route is set by the driver or a known navigation system. The autonomous drive ECU 7 executes the autonomous driving according to the travel plan. The autonomous drive. ECU 7 executes the autonomous driving by transmitting the control signal to an actuator (an engine actuator, a steering actuator, a brake actuator, or the like). The autonomous drive ECU 7 generates the travel plan using a known method and executes the autonomous driving.

In a case where preset condition for ending the autonomous driving is satisfied, the autonomous drive ECU 7 transmits a signal for ending the autonomous driving to the ECU 20 in the driving consciousness estimation device 100. On the other hand, in a case where a signal to shift the driving mode to the manual driving is received from the ECU 20, the autonomous drive ECU 7 ends the autonomous driving and causes the vehicle to be shifted to the manual driving. The manual driving means a state in which the vehicle is caused to travel by the driving operation of the driver with the driver as a main operator. In a case where an emergency evacuation signal is received from the ECU 20, the autonomous drive ECU 7 executes an emergency retraction. The emergency evacuation means a vehicle control to automatically evacuate the vehicle to a space such a road shoulder. The autonomous drive ECU 7 executes the emergency evacuation using a known method.

Next, a functional configuration of the ECU 20 will be described. A part of the functions of the ECU 20 described below may be an aspect of being executed by the computer in the facility such as the management center that can communicate with the vehicle and/or by the autonomous drive ECU 7. In addition, the ECU 20 may be integrated with the autonomous drive ECU 7.

The ECU 20 includes a driver image acquisition unit 21, a travelling environment recognition unit 22, a vehicle state recognition unit 23, a head state recognition unit 24, a driving readiness estimation unit 25, a driving task demand estimation unit 26, a margin calculation unit 27, an attention awakening unit 28, and a manual driving possibility determination unit 29.

The driver image acquisition unit 21 acquires a driver image from the driver monitor camera 1. In a case where the driver monitor camera 1 includes plural cameras, the driver image acquisition unit 21 acquires the driver images from each camera in association with each other.

The travelling environment recognition unit 22 recognizes the travelling environment around the vehicle. The travelling environment recognition unit 22 recognizes the travelling environment based on the result of detection by the external sensor 2, the position information from the GPS receiver 4, the map information in the map database 5 and the information relating to travel plan from the autonomous drive ECU 7. The travelling environment recognition unit 22 recognizes the travelling environment around the vehicle using a known method. A situation of obstacles around the vehicle and a travelling scene of the vehicle are included in the travelling environment.

The travelling environment recognition unit 22 recognizes the situation of the obstacles around the vehicle based on the result of detection by the external sensor 2. Positions of the obstacle with respect to the vehicle, a relative speed of the obstacle with respect to the vehicle, a moving direction of the obstacle with respect to the vehicle, and the like are included in the situation of the obstacles around the vehicle. Moving obstacle such as another vehicle, a pedestrian, and a bicycle, and stationary obstacles such as a guard rail, a wall, a building, and a parked vehicle are included in the obstacles.

As the situation of the obstacles around the vehicle, the travelling environment recognition unit 22 performs a calculation of a time to collision (TIC) between the vehicle and a preceding vehicle travelling in front of the vehicle. The time to collision can be obtained by dividing a vehicle-to-vehicle distance between the vehicle and the preceding vehicle by the relative speed of the vehicle and the preceding vehicle. As the situation of the obstacles around the vehicle, the travelling environment recognition unit 22 may calculate a vehicle-to-vehicle time (time head way: THW) between the vehicle and the preceding vehicle. The vehicle-to-vehicle time can be obtained by dividing the vehicle-to-vehicle distance between the vehicle and the preceding vehicle by the speed of the vehicle.

The travelling environment recognition unit 22 recognizes the travelling scene of the vehicle based on the position information from the GPS receiver 4 and the map information in the map database 5. The travelling scene of the vehicle includes a situation of the vehicle travelling on a straight road, a situation of the vehicle travelling on a curve, a situation of the vehicle merging into the merging lane, and a situation of the vehicle passing the intersection. The travelling environment recognition unit 22 may recognize the situation of the vehicle changing a lane as a travelling scene of the vehicle based on the position information of the vehicle, the map information, and a lighting situation of a direction indicator of the vehicle. The repetition of the situation of the vehicle changing a lane can be performed using a known method. The travelling environment recognition unit 22 may recognize the travelling scene of the vehicle based on information provided from the autonomous drive ECU 7.

The travelling environment recognition unit 22 recognizes an extending direction of the road (lane) on which the vehicle is travelling based on the image of the front of the vehicle imaged by the camera as the travelling environment using a known lane line recognition technology. The extending direction of the road means a direction to which the road is extended from the vehicle. For example, the travelling environment recognition unit 22 recognizes whether the extending direction of the road is a front direction of the vehicle, left direction of the vehicle, or the right direction of the vehicle. The travelling environment recognition unit 22 may recognize the extending direction of the road based on the position information of the vehicle and the map information. That is, if a shape of the road on which the vehicle is travelling is a straight shape, the front direction of the vehicle is the extending direction of the road. If the shape of the road is a left-curve, the left direction of the vehicle is the extending direction of the road. If the shape of the road is a right-curve, the right direction of the vehicle is the extending direction of the road.

In addition, the travelling environment recognition unit 22 recognizes a situation of the road (a curvature of the road, a shape of the road, a width of the road, or the like) on which the vehicle is travelling as the travelling environment, based on the position information and the map information. The travelling environment recognition unit 22 may recognize the situation of the road from the image imaged by the camera based on the result of detection by the external sensor 2.

The vehicle state recognition unit 23 recognizes a vehicle state during the travelling based on the result of detection by the internal sensor 3. The vehicle state includes the vehicle speed of the vehicle, the acceleration of the vehicle, and the yaw rate of the vehicle. Specifically, the vehicle state recognition unit 23 recognizes the vehicle speed of the vehicle based on the vehicle speed information from the vehicle speed sensor. The vehicle state recognition unit 23 recognizes the acceleration of the vehicle (the longitudinal acceleration and the lateral acceleration) based on the acceleration information from the accelerator sensor. The vehicle state recognition unit 23 recognizes the yaw rate of the vehicle based on the yaw rate information from the yaw rate sensor.

The head state recognition unit 24 recognizes a head state of the driver based on the driver image acquired by the driver image acquisition unit 21. The head state of the driver includes a direction of the driver's face, a state of the driver's eyes, or the like. The state of the driver's eyes includes a driver's line of sight, a saccade of the driver's eye balls or the like. The state of the driver's eyes may include a frequency of blink, a speed of closing the eyes, a state of closed eyes (a position of the upper eye lid), or the like. The head state recognition unit 24 recognizes the direction of the driver's face and the state of the driver's eyes using a known image processing method.

The head state of the driver includes a head pitch angle of the driver and a head roll angle of the driver. The head pitch angle means a rotation angle of the head of the driver around a vehicle width direction axis (an axis extending in the vehicle width direction of the vehicle). The head roll angle means a rotation angle of the head of the driver around a longitudinal direction axis of the vehicle (an axis extending in the longitudinal direction of the vehicle). The head pitch angle and the head roll angle are measured, for example, with an axis extending in the vertical direction of the vehicle (vertical axis) as a reference (zero point). The head state recognition unit 24 recognizes the head state of the driver such as the head pitch angle, the head roll angle, and a head yaw angle of the driver using a known image processing method. The head state of the driver may include the head yaw angle. The head yaw angle means a rotation angle around the vertical direction axis of the vehicle (an axis extending in the vertical direction of the vehicle). In this case, the head state recognition unit 24 can recognize the direction of the driver's face from the head pitch angle, the head roll angle, and the head yaw angle.

The driving readiness estimation unit 25 estimates a driving readiness relating to the driving consciousness of the driver. The driving consciousness is a generic term of a mental activity including the recognition, a prediction, a judgement, and an operation when the driver drives the vehicle. The driving readiness is a degree of the height of the driving consciousness of the driver, that is, a level of preparation for the driver's driving.

The driving readiness estimation unit 25 estimates the driving readiness from a driver's reaction to the travelling environment. The driving readiness estimation unit 25 may have an initial value of the driving readiness.

The driving readiness estimation Unit. 25 determines whether or not the driver is facing the extending direction of the road on which the vehicle is travelling based on the extending direction of the road on which the vehicle is travelling recognized by the travelling environment recognition unit 22 as the travelling environment and the direction of the driver's face recognized from the driver image by the head state recognition unit 24. In a case where it is determined that the driver is facing the extending direction, the driving readiness estimation unit 25 calculates the number of saccades of the eye balls (hereinafter, referred to as the number of saccades) per a predetermined time during a period in which the driver is facing the extending direction based on the saccade of the driver's eye balls recognized by the head state recognition unit 24.

The driving readiness estimation unit 25 estimates the driving readiness based on the number of saccades as driver's reaction to the travelling environment. It is considered that the face of the driver having a high driving consciousness is facing the extending direction of the road on which the vehicle is travelling and the number of saccades of the eye balls increases in order to visibly recognize the situation of the extending direction of the road. Therefore, in a case where the number of saccades is equal to or greater than a saccade threshold value, the driving readiness estimation unit 25 estimates that the driving readiness has a large value compared to a case where the number of saccades is smaller than the saccade threshold value. The saccade threshold value is value set in advance. The saccade threshold value which becomes a reference of the value of the driving readiness may be provided in plural. It is similar to threshold values described hereafter.

The driving readiness estimation unit 25 calculates the head roll angle with respect to the curvature of the road based on the curvature of the road on which the vehicle is travelling recognized by the travelling environment recognition unit 22 as the travelling environment and the head roll angle of the driver recognized by the head state recognition unit 24 from the driver image. The driving readiness estimation unit 25 calculates the head roll angle per a predetermined time interval. The driving readiness estimation unit 25 estimates the driving readiness based on the head roll angle with respect to the curvature of the road as a driver's reaction to the travelling environment. Since the driver having a high driving consciousness takes a readiness against a centrifugal force added to the driver according to the curvature of the road, it is considered that the head roll angle is smaller compared to a case of the driver having low driving consciousness. Therefore, in a case where the head roll angle with respect to the same curvature of the road is smaller than the head roll angle threshold value, the driving readiness estimation unit 25 estimates that the driving readiness is larger compared to a case where the head roll angle is equal to or greater than the head roll angle threshold value. The head roll angle threshold value is a threshold value of which the value is set in advance according to the curvature of the road. The driving readiness estimation unit 25 does not necessarily need to estimate the driving readiness based on the curvature of the road and the head roll angle.

In addition, the driving readiness estimation unit 25 estimates the driving readiness from the driver's reaction to the vehicle state.

The driving readiness estimation unit 25 calculates the head pitch angle with respect to the longitudinal acceleration of the vehicle based on the longitudinal acceleration of the vehicle recognized by the vehicle state recognition unit 23 as the vehicle state and the head pitch angle of the driver recognized by the head state recognition unit 24 from the driver image. The driving readiness estimation unit 25 calculates the head pitch angle (a maximum value of an absolute value) with respect to the longitudinal acceleration of the vehicle (a maximum value of an absolute value) per a predetermined time interval.

The driving readiness estimation unit 25 estimates the driving readiness based on the head pitch angle with respect to the longitudinal acceleration of the vehicle as a driver's reaction to the vehicle state. Since the driver having a high driving consciousness predicts the travelling situation of the vehicle (starting, acceleration, deceleration, and stopping) and takes a readiness against the changes of the longitudinal acceleration, it is considered that the head pitch angle is smaller compared to a case of the driver having a low driving consciousness. Therefore, in a case where the head pitch angle with respect to the longitudinal acceleration is smaller than the head pitch angle threshold value, the driving readiness estimation unit 25 estimates that the driving readiness has a large value compared to a case where the head pitch angle with respect to the same longitudinal acceleration is equal to or greater than the head pitch angle threshold value. The head pitch angle threshold value is a threshold value set in advance according to the longitudinal acceleration of the vehicle.

The driving readiness estimation unit 25 calculates the head roll angle with respect to the yaw rate of the vehicle based on the yaw rate of the vehicle recognized by the vehicle state recognition unit 23 as the vehicle state and the head roll angle of the driver recognized by the head state recognition unit 24 from the driver image. The driving readiness estimation unit 25 calculates the yaw rate (a maximum value of an absolute value) and the head roll angle (a maximum value of an absolute value) per a predetermined time interval.

The driving readiness estimation unit 25 estimates the driving readiness based on the head roll angle with respect to the yaw rate as a driver's reaction to the vehicle state. Since the driver having a high driving consciousness predicts the travelling situation of the vehicle (a curve and right and left turns) and is defensive to the yaw rate of the vehicle (generation of the centrifugal force), it is considered that the head roll angle is smaller compared to a case of the driver having a low driving consciousness. Therefore, in a case where the head roll angle with respect to the yaw rate is smaller than a second head roll angle threshold value, the driving readiness estimation unit 25 estimates that the driving readiness is larger compared to a case where the head roll angle with respect to the same yaw rate is equal to or greater than the second head roll angle threshold value. The second head roll angle threshold value is a threshold value set in advance according to the yaw rate. The driving readiness estimation unit 25 does not necessarily need to estimate the driving readiness based on the yaw rate and the head roll angle.

In addition, the driving readiness estimation unit 25 may estimate the driving readiness based on only the driver's reaction to the travelling environment, and may estimate the driving readiness based on only the driver's reaction to the vehicle state. In a case where the driving readiness is estimated based on only the driver's reaction to the travelling environment, the ECU 20 does not necessarily include the vehicle state recognition unit 23.

The driving task demand estimation unit 26 estimates a driving task demand. The driving task demand is an index of the driving readiness required for the driver from the travelling environment. The driving task demand estimation unit 26 estimates the driving task demand based on the travelling environment recognized by the travelling environment recognition unit 22. The driving task demand estimation unit 26 may have an initial value of the driving task demand. The initial value may be set so as to increase in proportional to the vehicle speed of the vehicle.

The driving task demand estimation unit 26 estimates the driving task demand based on the time to collision between the vehicle and the preceding vehicle recognized by the travelling environment recognition unit 22 as the travelling environment. In a case where the time to collision between the vehicle and the preceding vehicle is shorter than the TTC threshold value, the driving task demand estimation unit 26 estimates that the driving task demand is larger compared to a case where the time to collision is equal to or longer than the TTC threshold value. The TTC threshold value is a threshold value set in advance. A vehicle-to-vehicle tune may be used instead of the time to collision.

The driving task demand estimation unit 26 estimates the driving task demand based on the curvature of the road on which the vehicle is travelling recognized by the travelling environment recognition unit 22 as the travelling environment. In a case where the curvature of the road on which the vehicle is travelling is equal to or greater than a curve threshold value, the driving task demand estimation unit 26 estimates that the driving task demand is larger compared to a case where the curvature of the road is smaller than the curve threshold value. The curve threshold value is a threshold value set in advance.

The margin calculation unit 27 calculates a margin which is a result of comparison between the driving readiness and the driving task demand. The margin can be calculated as a value obtained by dividing a difference of the driving readiness and the driving task demand by the driving task demand. The margin may be a value of the difference of the driving readiness and the driving task demand. In a case where the driving task demand is larger than the driving readiness a case where the driving consciousness of the driver is estimated to be low with respect to the travelling environment), the margin has negative value.

In a case where the margin calculated by the margin calculation unit 27 is smaller than a margin threshold value, the attention awakening unit 28 performs awakening of the driver's attention to the driving of the vehicle for the driver. The margin threshold value is a threshold value set in advance so as to be a reference for determining whether or not the driving readiness is sufficient enough compared to the driving task demand. The margin threshold value is basically set as a positive value. The attention awakening wilt 28 uses the margin threshold values different from each other in a case of the manual driving and in a case of the autonomous driving of the vehicle respectively. The margin threshold value in a case of the manual driving of the vehicle is greater than the margin threshold value in a case of the autonomous driving of the vehicle. In addition, in a case where the autonomous drive ECU 7 can execute the autonomous driving according to the different autonomous driving level, the attention awakening unit 28 uses the margin threshold value having a different value according to the executed autonomous driving level. As the executed autonomous driving level increases, the value of the margin threshold value used by the attention awakening unit 28 decreases.

The attention awakening unit 28 performs awakening of the driver's attention relating to the driving of the vehicle such that the margin becomes equal to or greater than the margin threshold value (such that the driving readiness increases sufficient enough). The attention awakening unit 28 transmits the control signal to the HMI 6 and performs awakening of the driver's attention by displaying the image on the display and/or outputting the voice from the speaker. In a case where a vibration mechanism is prepared on a driver's seat, the attention awakening unit 28 may awaken the driver's attention using a vibration.

The manual driving possibility determination unit 29 determines whether or not the driver is in the manual driving possible situation in a case where a signal for ending the autonomous driving received from the autonomous drive ECU 7 (when the ECU 7 ends the autonomous driving of the vehicle). In a case where the margin is equal to or greater than a threshold value for shifting to the manual driving, the manual driving possibility determination unit 29 determines that the driver is in the manual driving possible situation. In a case where the margin is smaller than the threshold value for shifting to the manual driving, the manual driving possibility determination unit 29 determines that the driver is not in the manual driving possible situation. The threshold value for shifting to the manual driving is a threshold value set in advance so as to be a reference for determining whether or not the driver is in the manual driving possible situation.

In a case where it is determined that the driver is in the manual driving possible situation, the manual driving possibility determination unit 29 transmits a signal to shift the driving mode to the manual driving to the autonomous drive ECU 7. The autonomous drive ECU 7 performs processing to shift the driving mode to the manual driving using a known method. In a case where the manual driving possibility determination unit 29 determines that the driver is in the manual driving possible situation, the attention awakening unit 28 performs awakening of the driver's attention to shift the driving mode to the manual driving. The awakening of the attention to shift the driving mode to the manual driving is the awakening of the attention for the driver to shift the driving mode to the manual driving by displaying the image on the display or the voice outputting from the speaker. The awakening of the attention to shift the driving mode to the manual driving is the awakening of the attention relating to the driving of the vehicle.

On the other hand, in a case where the manual driving possibility determination unit 29 determines that the driver is not in the manual driving possible situation, the attention awakening unit 28 performs awakening of the driver's attention relating to the driving of the vehicle. The attention awakening unit 28 performs awakening of the driver's attention to increase the driving readiness of the driver such that the driver is determined to be in the manual driving possible situation. The attention awakening unit 28 performs awakening of the driver's attention until the driver is determined to be in the manual driving possible situation or manual driving possibility determination unit 29 ends the determination due the time elapses.

In a case where it is determined that the driver is not in the manual driving possible situation, the manual driving possibility determination unit 29 repeats the determination of the manual driving possibility during a margin time set in advance. The margin time is set in the autonomous drive ECU 7 using a known method. In a case where it is determined that the driver is in the manual driving possible situation, the manual driving possibility determination unit 29 ends the determination and transmits the signal to shift the driving mode to the manual driving to the autonomous drive ECU 7. In a case where it is not possible to determine that the driver is in the manual driving possible situation even when the margin time has elapsed, the manual driving possibility determination unit 29 transmits a an emergency retraction signal to the autonomous drive ECU 7. In a case where the emergency retraction signal is received from the ECU 20, the autonomous drive ECU 7 executes an emergency retraction to automatically retract the vehicle to the road shoulder and the like.

[Attention Awakening Processing in the Driving Consciousness Estimation Device]

Figure 2:
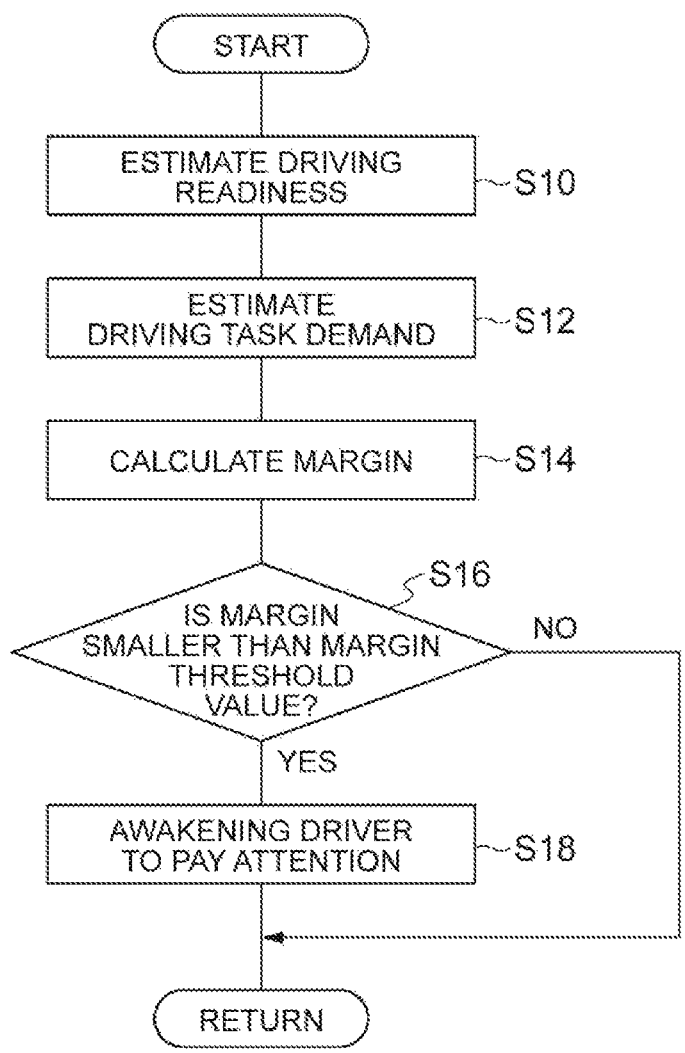
FIG. 2 is a flowchart illustrating attention awakening processing in the driving consciousness estimation device.

Next, the attention awakening processing in the driving consciousness estimation device 100 in the present embodiment will be described with reference to FIG. 2. FIG. 2 is flowchart illustrating the attention awakening processing in the driving consciousness estimation device 100. The flowchart in FIG. 2 is executed when the vehicle is travelling.

As illustrated in FIG. 2, the ECU 20 in the driving consciousness estimation device 100 performs the estimation of the driving readiness using the driving readiness estimation unit 25 in S10. The driving readiness estimation unit 25 estimates the driving readiness based on the driver's reaction to the travelling environment and the driver's reaction to the vehicle state.

The ECU 20 performs the estimation of the driving task demand using the driving task demand estimation unit 26 in S12. The driving task demand estimation unit 26 estimates the driving task demand based on the travelling environment recognized by the travelling environment recognition unit 22. The processing items in S10 and S12 may be performed in reverse order or may be performed at the same time.

In S14, the ECU 20 performs the calculation of the margin using the margin calculation unit 27. The margin calculation unit 27 calculates the margin which is the result of comparison between the driving readiness and the driving task demand.

In S16, the ECU 20 determines whether or not the margin is smaller than the margin threshold value using the attention awakening unit 28. The margin threshold values used in a case where the vehicle is in the manual driving and that in a case where the vehicle is in the autonomous driving are different from each other. In a case where it is determined that the margin is not smaller than the margin threshold value (NO in S16), the ECU 20 ends the current attention awakening processing. Thereafter, the ECU 20 repeats the processing from S10 after a predetermined time interval has elapsed. In a case where it is determined that the margin is smaller than the margin threshold value (YES in S16), the ECU 20 shifts the process to S18.

In S18, the ECU 20 performs awakening of the driver's attention relating to the driving of the vehicle using the attention awakening unit 28. The attention awakening unit 28 transmits the control signal to the HMI 6 and performs awakening of the attention by displaying the image on the display and/or outputting the voice from the speaker such that the margin becomes equal to or greater than the margin threshold value. Thereafter, the ECU 20 ends the current attention awakening processing. Thereafter, the ECU 20 repeats the processing from S10 after a predetermined time interval has elapsed. In a case where the manual driving possibility determination processing described below is executed, the ECU 20 ends the attention awakening, processing.

[Manual Driving Possibility Determination Processing in the Driving Consciousness Estimation Device]

Subsequently, the manual driving determination processing by the driving consciousness estimation device 100 in the present embodiment will be described with reference to FIG. 3. FIG. 3 is a flowchart illustrating the manual driving determination processing in the driving consciousness estimation device 100. The flowchart illustrated in FIG. 3 is executed in a case where the signal for ending the autonomous driving is received from the autonomous drive ECU 7.

As illustrated in FIG. 3, as S20, the ECU 20 in the driving consciousness estimation device 100 performs the estimation of the driving readiness using the driving readiness estimation unit 25. The processing items in S20 to S24 are the same as the processing items in S10 to S14 illustrated in FIG. 2, and thus, the details of the description thereof will be omitted.

In S22, the ECU 20 performs the estimation of the driving task demand using the driving task demand estimation unit 26. In S24, the ECU 20 performs the calculation of the margin using the margin calculation unit 27.

In S26, the ECU 20 determines whether or not the margin is smaller than the threshold value for shifting to the manual driving using the manual driving possibility determination unit 29. In a case where it is determined that the margin is not smaller than the threshold value for shifting to the manual driving (NO in S26), the ECU 20 assumes that the driver is in the manual driving possible situation and shifts the process to S28. In a case where it is determined that the margin is smaller than the threshold value for shifting to the manual driving (YES in S26), the ECU 20 assumes that the driver is not in the manual driving possible situation, and shifts the process to S32.

In S28, the ECU 20 performs awakening of the driver's attention to shift the driving mode to the manual driving using the attention awakening unit 28. The attention awakening unit 28 performs awakening of the driver's attention to shift the driving mode to the manual driving by displaying the image on the display and/or outputting the voice from the speaker. Thereafter, in S30, the ECU 20 transmits the signal to shift the driving mode to the manual driving to the autonomous drive ECU 7 from the manual driving possibility determination unit 29, and then, ends the manual driving possibility determination processing.

On the other hand, in S32, the ECU 20 performs awakening of the driver's attention relating to the driving of the vehicle using the attention awakening unit 28. The attention awakening unit 28 performs awakening of the driver's attention so as to increase the driving readiness of the driver such that the driver is determined to be in the manual driving possible situation. Thereafter, the ECU 20 repeats the processing from S20 after a predetermined time interval has elapsed.

Even when the margin time set in advance has elapsed, in a case where it is not determined that the driver is in the manual driving possible situation by, the manual driving possibility determination unit 29, the ECU 20 transmits the emergency retraction signal to the autonomous drive ECU 7, and then, ends the manual driving determination processing.

[Estimation Processing of the Driving Readiness in the Driving Consciousness Estimation Device]

Hereinafter, the driving readiness estimation processing will be described. FIG. 4A is a flowchart illustrating an example of the estimating a driving readiness. The flow chart illustrated in FIG. 4A is executed when the estimation of the driving readiness is performed.

As illustrated in FIG. 4A, in S40, the ECU 20 in the driving consciousness estimation device 100 recognizes the extending direction of the road on which the vehicle is travelling as the travelling environment using the travelling environment recognition unit 22. The travelling environment recognition unit 22 recognizes the extending direction of the road based on the image in which the front of the vehicle is imaged by the camera.

In S42, the ECU 20 recognizes the direction of the driver's face using the head state recognition unit 24. The head state recognition unit 24 recognizes the direction of the driver's face based on the driver image.

In S44, the ECU 20 determines whether or not the driver is facing the extending direction using the driving readiness estimation unit 25. The driving readiness estimation unit 25 performs the above-described determination based on the extending direction of the road on which the vehicle is travelling recognized as the travelling environment by the travelling environment recognition unit 22 and the direction of the driver's face recognized by the head state recognition unit 24 from the driver image. In a case Where it is determined that the driver is not facing the extending direction of the road (NO in S44), the ECU 20 ends the current processing. Thereafter, in a case where the estimation of the driving readiness is not completed, the ECU 20 performs the processing again from S40 after the predetermined time interval has elapsed. In a case where it is determined that the driver is facing the extending direction (YES in S44), the ECU 20 shifts the process to S46.

In S46, the ECU 20 calculates the number of saccade of the driver's eye halls using the driving readiness estimation unit 25. The driving readiness estimation unit 25 calculates the number of saccades of the eye balls per a predetermined time interval during the time when the driver is facing the extending direction based on the saccade of the driver's eye balls recognized by the head state recognition unit 24.

In S48, the ECU 20 determines whether or not the number of saccades is equal to or greater than the saccade threshold value using the driving readiness estimation unit 25. In a case where it is determined that the number of saccades is not equal to or greater than the saccade threshold value (NO in S48), the ECU 20 ends the current processing. Thereafter, in a case where the estimation of the driving readiness is not completed, the ECU 20 performs the processing again from S40 after the predetermined time interval has elapsed. In a case where it is determined that the number of saccades is equal to or greater than the saccade threshold value (YES in S48), the ECU 20 shifts the process to S50.

In S50, the ECU 20 estimates the driving readiness using the driving readiness estimation unit 25. The driving readiness estimation unit 25 estimates that the driving readiness has a large value compared to a case of NC) in S48.

Figure 4B:
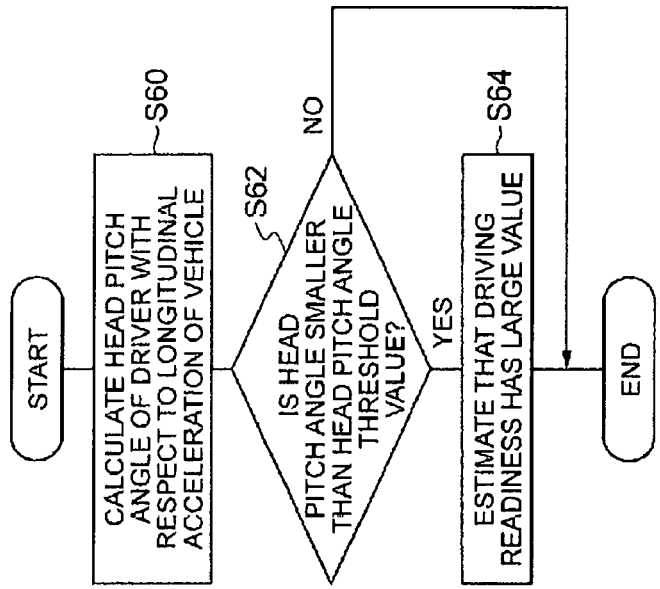
FIG. 4B is a flowchart illustrating another example of estimating a driving readiness.
Figure 4A:
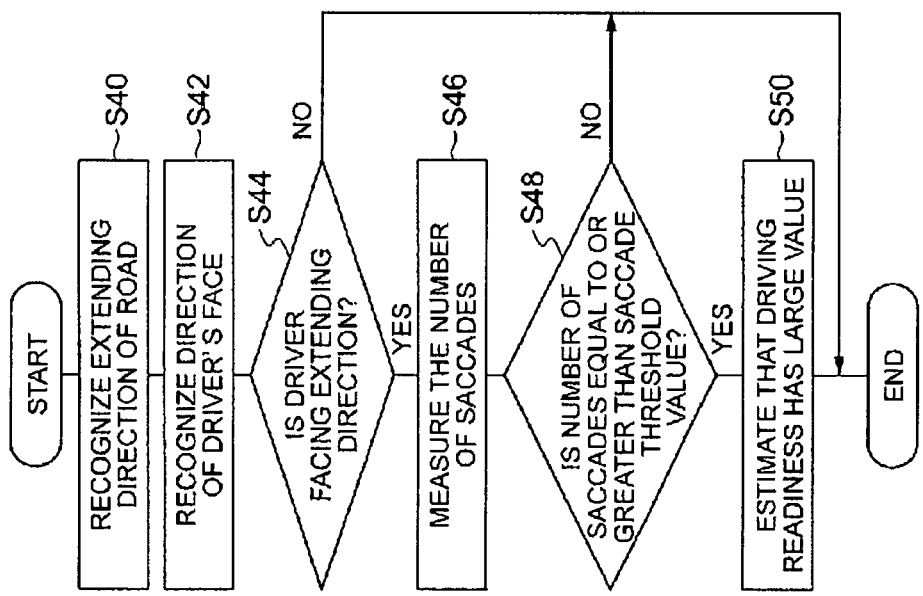
FIG. 4A is a flowchart illustrating an example of estimating a driving readiness.

FIG. 4B is a flowchart illustrating another example of estimating a driving readiness. The flow chart illustrated in FIG. 4A is executed when the estimation of the driving readiness is performed.

As illustrated in FIG. 4B, in S60, the ECU 20 in the driving consciousness estimation device 100 calculates the head pitch angle with respect to the longitudinal acceleration of the vehicle using the driving readiness estimation unit 25. The driving readiness estimation unit 25 calculates the head pitch angle with respect to the longitudinal acceleration of the vehicle based on the longitudinal acceleration of the vehicle recognized by the vehicle state recognition unit 23 as the vehicle state and the head pitch angle of the driver recognized by the head state recognition unit 24 from the driver image. The driving readiness estimation unit 25 calculates, for example, the longitudinal acceleration (a maximum value of an absolute value) and the head pitch angle (absolute value and the maximum value) for each predetermined time interval.

In S62, the ECU 20 determines whether or not the head pitch angle with respect to the longitudinal acceleration is smaller than the head pitch angle threshold value using the driving readiness estimation unit 25. In a case where it is determined that the head pitch angle with respect to the longitudinal acceleration is not smaller than the head pitch angle threshold value (NO in S62), the ECU 20 ends the current processing. Thereafter, the in a case where the estimation of the driving readiness is not completed, the ECU 20 performs the processing again from S60 after the predetermined time interval has elapsed. In a case where it is determined that the head pitch angle with respect to the longitudinal acceleration is smaller than the head pitch angle threshold value (YES in S62), the ECU 20 shifts the process to 864.

In S64, the ECU 20 estimates the driving readiness using the driving readiness estimation unit 25. The driving readiness estimation unit 25 estimates that the driving readiness has a large value compared to the case of NO in 862.

[Estimation Processing of the Driving Task Demand in the Driving Consciousness Estimation Device]

Hereinafter, the processing of estimating the driving task demand in the driving consciousness estimation device 100 will be described. FIG. 5A is a flowchart illustrating an example of estimating the driving task demand. The flowchart illustrated in FIG. 5A is executed when the estimation of the driving task demand is performed.

As illustrated in FIG. 5A, as S70, the ECU 20 in the driving consciousness estimation device 100 determines whether or not the preceding vehicle is present using the travelling environment recognition unit 22. The travelling environment recognition unit 22 determines whether or not the preceding vehicle is present based on the result of detection by the external sensor 2. In a case where it is determined that the preceding vehicle is not present (NO in S70), the ECU 20 ends the current processing. Thereafter, in a case where the estimation of the driving task demand is not completed, the ECU 20 performs the processing again from S70 after the predetermined time interval has elapsed. In a case where it is determined that the preceding vehicle is present (YES in S70), the ECU 20 shifts the process to S72.

In S72, the ECU 20 calculates the time to collision between the vehicle and the preceding vehicle using the travelling environment recognition unit 22. The travelling environment recognition unit 22 calculates the time to collision based on the result of detection by the external sensor 2.

In S74, the ECU 20 demand determines whether to collision between the vehicle and the preceding vehicle is shorter than the TTC threshold value using the driving task demand estimation unit 26. In a case where it is determined that the time to collision is not shorter than the TTC threshold value (NO in S74), the ECU 20 ends the current processing. Thereafter, the in a case where the estimation of the driving task demand readiness is not completed, the ECU 20 performs the processing again from S70 after the predetermined time interval has elapsed. In a case where it is determined that the time to collision is shorter than the TTC, threshold value (YES in S74), the ECU 20 shifts the process to S76.

In S76, the ECU 20 estimates the driving task demand using the driving task demand estimation unit 26. The driving task demand estimation unit 26 estimates that the driving task demand has a large value compared to the case of NO in S74.

FIG. 5B is a flowchart illustrating another example of estimating the driving task demand. The flowchart illustrated in FIG. 5A is executed when the estimation of the driving task demand is performed.

As illustrated in FIG. 5B, the ECU 20 in the driving consciousness estimation device 100 performs the recognition of the curvature of the road as the travelling environment using the travelling environment recognition unit 22 as S80. The travelling environment recognition unit 22 recognizes the curvature of the road on which the vehicle is travelling based on the position information of the vehicle and the map information.

As S82, the ECU 20 determines whether or not the curvature of the road is equal to or greater than the curve threshold value using the driving task demand estimation unit 26. In a case where it is determined that the curvature of the road is not equal to or greater than the curve threshold value (NC) in S82), the ECU 20 ends the current processing. Thereafter, in a case where the estimation of the driving task demand is not completed, the ECU 20 performs the processing again from S80 after the predetermined time interval has elapsed. In a case where it is determined that the curvature of the road is equal to or greater than the curve threshold value (YES in S82), the ECU 20 shifts the process to S84.

In S84, the ECU 20 estimates the driving task demand using the driving task demand estimation unit 26. The driving task demand estimation unit 26 estimates that the driving task demand has a larger value compared to the case of NO in S82.

[Action Effects of the Driving Consciousness Estimation Device]

According to the driving consciousness estimation device 100 in the present embodiment described above, it is considered that the reaction of the driver of the vehicle having a high driving consciousness to the travelling environment around the vehicle is different from that of the driver having a low driving consciousness. Therefore, it is possible to appropriately estimate the driving readiness relating to the driving consciousness of the driver using the driver's reaction to the travelling environment. Therefore, in this driving consciousness estimation device, it is possible to appropriately perform awakening of the driver's attention relating to the driving of the vehicle while considering the driving consciousness of the driver by performing awakening of the attention based on the result of comparison between the appropriately estimated driving readiness and the driving task demand required for the driver due to the travelling environment.

Similarly, according to the driving consciousness estimation device 100, it is considered that the reaction of the driver of the vehicle having a high driving consciousness to the vehicle state of the vehicle is different from that of the driver having a low driving consciousness. Therefore, it is possible to appropriately estimate the driving readiness relating to the driving consciousness of the driver using the driver's reaction to the vehicle state. Therefore, in this driving consciousness estimation device, it is possible to appropriately perform awakening of the driver's attention relating to the driving of the vehicle while considering the driving consciousness of the driver by performing awakening of the attention based on the result of comparison between the appropriately estimated driving readiness and the driving task demand required for the driver due to the travelling environment.

In addition, in the driving consciousness estimation device 100, the driving readiness is estimated based on the number of saccades of the eye balls per a predetermined time interval during the time when the drive is facing the extending direction of the road on which the vehicle is travelling. Therefore, in the driving consciousness estimation device 100, it is considered that the face of the driver having a high driving consciousness is facing the extending direction of the road on which the vehicle is travelling, and the number of saccades of the eye balls increases in order to recognize the situation in the extending direction of the road. Therefore, it is possible to appropriately estimate the driving readiness based on the number of saccades of the eye balls per a predetermined time interval during the time when the drive is facing the extending direction of the road.

In addition, in the driving consciousness estimation device 100, the driving readiness is estimated based on the head pitch angle of the driver with respect to the longitudinal acceleration of the vehicle. Therefore, in the driving consciousness estimation device 100, it is considered that the driver having a high driving consciousness takes the readiness while estimating a change of the longitudinal acceleration of the vehicle, and thus, the head pitch angle decreases. Therefore, it is possible to appropriately estimate the driving readiness based on the head pitch angle with respect to the longitudinal acceleration of the vehicle.

In addition, in the driving consciousness estimation device 100, the result of comparison between the driving readiness and the driving task demand is calculated as the margin, and in a case where the margin is smaller than the margin threshold value, the awakening of the attention is performed. Therefore, according to the driving consciousness estimation device 100, by calculating the result of comparison between the driving readiness and the driving task demand as the margin, it is possible to determine whether or not to execute awakening of the attention using one index.

In addition, in the driving consciousness estimation device 100, when the autonomous driving ECU ends the autonomous driving, whether or not the driver is in the manual driving possible situation is determined based on the result of comparison between the driving readiness and the driving task demand. Therefore, in the driving consciousness estimation device 100, since whether or not the driver is in the manual driving possible situation is determined based on the result of comparison between the driving readiness and the driving task demand, it is possible to appropriately determine whether or not the driver is in the manual driving possible situation while considering the driving consciousness of the driver.

Figure 6:
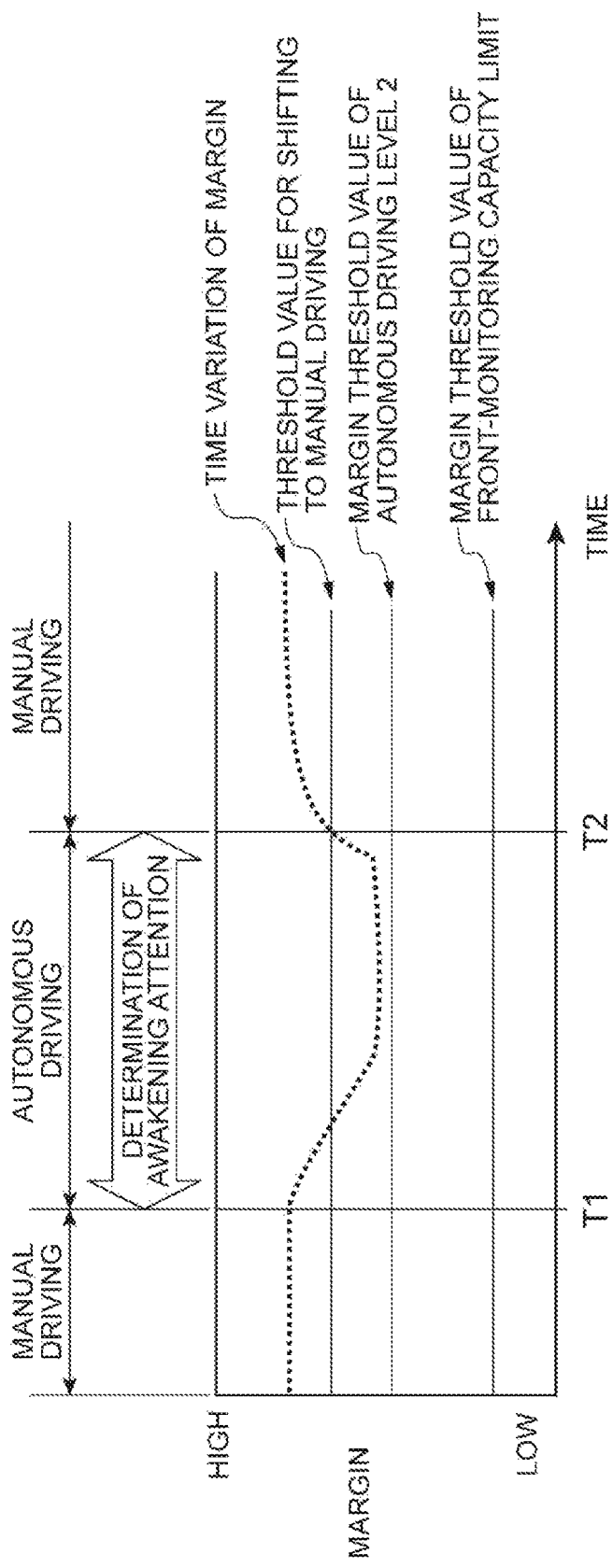
FIG. 6 is a graph illustrating an example of a time variation of a margin in a case of autonomous driving level 2.

Here, FIG. 6 is a graph illustrating an example of a time variation of the margin in a case of autonomous driving level 2. The vertical axis represents the margin and the horizontal axis represents the time. In FIG. 6, a situation is illustrated, in which the driving state of the vehicle starts from a manual driving state, the autonomous driving starts at a time point T1, and the autonomous driving ends at a time point T2 and is shifted to the manual driving. In FIG. 6, the time variation of the margin is illustrated in a dashed line.

In the situation illustrated in FIG. 6, the driver performing the manual driving starts in a state hi which the margin is higher than the threshold value for shifting to the manual driving, and when the driving mode is shifted to the autonomous driving, the margin decreases down to smaller than the threshold value for shifting to the manual driving. Therefore, the driving consciousness estimation device 100 performs awakening of the attention for the driver when the autonomous driving is ended and shifted to the manual driving. When the driving readiness of driver increases and the margin becomes equal to or higher than the threshold value for shifting to the manual driving due to the awakening of the attention, the driving consciousness estimation device 100 transmits the signal to shift the driving mode to the manual driving to the autonomous drive ECU 7 and the driving mode is shifted to the manual driving. In the driving consciousness estimation device 100, in a case where the margin of the driver becomes smaller than the margin threshold value of the autonomous driving level 2 during the autonomous driving, awakening of the driver's attention is performed. In a case where the margin of the driver becomes smaller than the margin, threshold value of a front-monitoring capacity limit during the autonomous driving, the driving consciousness estimation device 100 performs awakening of the attention with a stronger stimulus such a stronger volume of the voice output compared to a case where the margin of the driver becomes smaller than the margin threshold value of the autonomous driving level 2.

Figure 7:
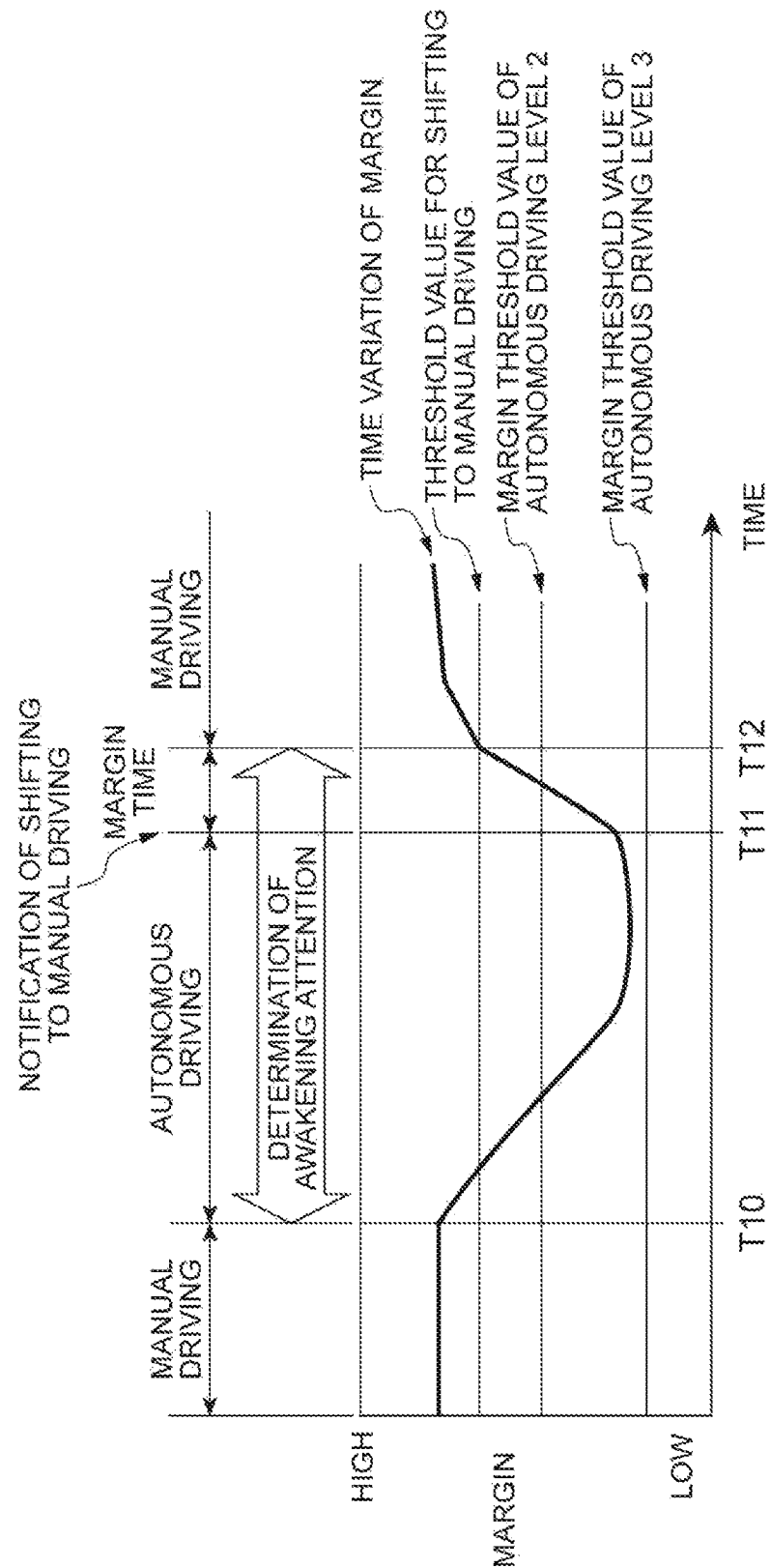
FIG. 7 is a graph illustrating an example of the time variation of the margin in a case of autonomous driving level 3.

FIG. 7 is a graph illustrating an example of the time variation of the margin in a case of autonomous driving level 3. The vertical axis represents the margin and the horizontal axis represents the time. In FIG. 7, the driving state of the vehicle starts from a manual driving state, the autonomous driving starts at a time point T10, the ending of the autonomous driving at the point T11 is determined, and a margin time in which the autonomous driving is not completely ended up to the time point T12 is provided. Then, the driving mode is shifted to the manual driving from the time point 112. In FIG. 7, the time variation of the margin is illustrated in a solid line.

In the situation illustrated in FIG. 7, the driver performing the manual driving starts in a state in which the margin is higher than the threshold value for shifting to the manual driving, and when the driving mode is shifted to the autonomous driving, the margin decreases down to smaller than the threshold value for shifting to the manual driving. Therefore, the driving consciousness estimation device 100 performs awakening of the attention for the driver during the margin time before the autonomous driving is completely ended. When the driving readiness of driver increases and the margin becomes equal to or higher than the threshold value for shifting to the manual driving due to the awakening of the attention, the driving consciousness estimation device 100 transmits the signal to shift the driving mode to the manual driving to the autonomous drive ECU 7 and the driving mode is shifted to the manual driving. In the situation illustrated in FIG. 7, since the autonomous driving of the autonomous driving level 3 is executed, even when the margin during the autonomous driving becomes smaller than the margin threshold value of the autonomous driving level 2, awakening of the attention is not performed. In a case where the margin during the autonomous driving becomes smaller than the margin threshold value of the autonomous driving level 3, the driving consciousness estimation device 100 performs awakening of the driver's attention. In FIG. 6 and FIG. 7, in a case where the driving task demand is constant, the margin can be replaced by the driving readiness.

As above, a preferable embodiment of the present invention is described. However, the present invention is not limited to the embodiment described above. In addition to the embodiment described above, the present invention can be embodied in various forms in which various changes and modifications are implemented based on the knowledge of those skilled in the art.

Modification Example

Figure 8:
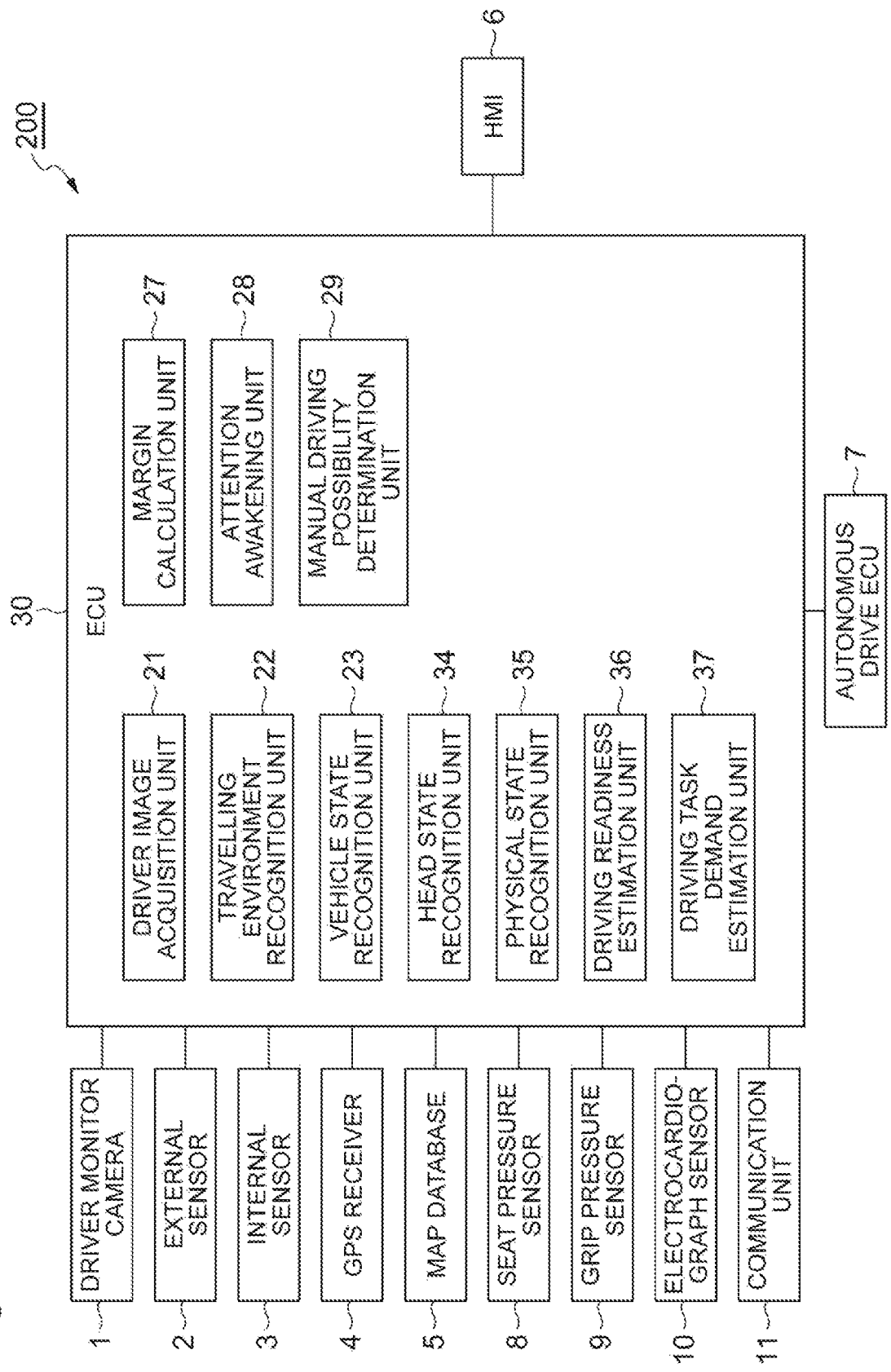
FIG. 8 is a block diagram illustrating a driving consciousness estimation device in a modification example.

Next, a driving consciousness estimation device 200 in a modification example of the present invention will be described with reference to the drawings. FIG. 8 is a block diagram illustrating the driving consciousness estimation device 200 in the modification example. As illustrated in FIG. 8, the driving consciousness estimation device 200 further includes a seat pressure sensor 8, a grip pressure sensor 9, an electrocardiograph sensor 10, and a communication unit 11 compared to the embodiment described above. The driving consciousness estimation device 200 does not need to necessarily include all of the seat pressure sensor 8, the grip pressure sensor 9, the electrocardiograph sensor 10, and the communication unit 11.

The seat pressure sensor 8 is a detection device that detects a seat pressure of the driver's seat. The seat pressure sensor 8 is configured to include plural sensors provided under the driver's seat, and can detect a load distribution on the driver's seat as the seat pressure. The seat pressure sensor 8 transmits the detected seat pressure information to the ECU 30.

The grip pressure sensor 9 is a detection device provided on the steering wheel of the vehicle, and detects a grip pressure of the driver to the steering wheel. The grip pressure sensor 9 may have a function of measuring a pressure distribution (a gap distance between the fingers of a hand). The grip pressure sensor 9 transmits the detected grip pressure information to ECU 30.

The electrocardiograph sensor 10 is a detection device provided on the steering wheel of the vehicle, and measures the electrocardiograph of the driver gripping the steering wheel. The electrocardiograph sensor 10 includes electrodes that are embedded at the right and left sides of the steering wheel and measures the electrocardiograph of the driver through the hands gripping the steering wheel. The electrocardiograph sensor 10 transmits the detected electrocardiographic information of the driver to the ECU 30. The electrocardiograph sensor 10 may include a pulse wave measurement light sensor for measuring the pulse wave from the hands of the driver.

The communication unit 11 performs communications with various wearable devices attached to a body of the driver. A wristwatch type device attached to a driver's arm, an eye glass type device worn to a driver's face or the like are included in the wearable devices. The wearable device acquires such as an electrocardiograph of the driver, an electromyography of the driver, and a brain wave of the driver. The communication unit 11 transmits the body information of the driver acquired from the wearable devices to the ECU 30 via wireless communications.

Subsequently, a functional configuration of the ECU 30 in the driving consciousness estimation device 200 will be described. The ECU 30 further includes a physical state recognition unit 35 compared to the embodiment described above. In addition, a head state recognition unit 34, a driving readiness estimation unit 36, and a driving task demand estimation unit 37 have additional functions.

The head state recognition unit 34 recognizes an inattentiveness of the driver based on the driver image. A state of looking away like a state in which the driver is looking at an information terminal such as a smart phone is included in the inattentiveness. In addition, the head state recognition unit 34 may determine whether or not the driver is checking right and left of an intersection and the like using the direction of the driver's face. The head state recognition unit 34 may determine whether or not the driver is checking the rear side of the adjacent lane in changing the lane and the like using the direction of the driver's face.

In addition, in a case where information on the brain wave of the driver is acquired from a wearable device (for example, a glass type wearable device) attached to the body of the driver via the communication unit 11, the head state recognition unit 34 may recognize the brain wave of the driver as the head state of the driver. The head state recognition unit 24 recognizes a Γ wave, β wave, α wave, and θ wave as the brain wave.

The physical state recognition unit 35 recognizes the physical state of the driver based on the driver image acquired by the driver image acquisition unit 21. The physical state of the driver includes a state of the driving position in which the driver is gripping the steering wheel while stretching back muscle, a hand-departed state in which the hands are departed from the steering wheel, a state of a rest position in which the driver is deeply leaning the driver's seat, and a state of a checking position in which the driver is checking the right and left sides while temporarily leaning forward at the intersection. The physical state recognition unit 35 recognizes the physical state of the driver using a known image processing method.

In addition, the physical state recognition unit 35 may recognize the physical state of the driver based on the seat pressure information from the seat pressure sensor 8 in addition to the driver image. The physical state recognition unit 35 recognizes the physical state of the driver from the seat pressure information using map data in which the seat pressure information and the physical state of the driver are associated with each other in advance. The physical state recognition unit 35 may recognize the physical state of the driver based on both the driver image and the seat pressure information.

The physical state recognition unit 35 may determine whether or not the body of the driver is in a stiffening state based on the driver image and the seat pressure information. The stiffening state is a state in which a minute movement of the body of the driver is decreased due to a tension at the time of travelling on a narrow road and the like. The physical state recognition unit 35 may store personal information of the driver which becomes the reference for determining the stiffening state.

In addition, the physical state recognition unit 35 may further recognize the driver's grip pressure on the steering wheel as the physical state of the driver. In this case, the physical state recognition unit 35 recognizes the driver's grip pressure on the steering wheel based on the grip pressure information from the grip pressure sensor 9. In a case where the grip pressure sensor 9 has a function of measuring the pressure distribution, the physical state recognition unit 35 recognizes the gap distance between the fingers of the hands based on the grip pressure information from the fact that the gap distance between the fingers of the hands is reduced when the driver is in the tension. In a case where a pressure sensor is provided on an arm rest in the vehicle, the physical state recognition unit 35 may recognize a driver's pressing pressure on the arm rest as the physical state of the driver.

The physical state recognition unit 35 may further recognize the driver's variations in the heart rate as the physical state of the driver. In this case, the physical state recognition unit 35 recognizes the driver's variations in the heart rate based on the electrocardiograph information from the electrocardiograph sensor 10. The physical state recognition unit 35 recognizes the variations in the heart rate as, for example, a Coefficient of Variation of R-R intervals in Electrocardiogram (CVRR). The CVRR is obtained from an Equation described below.

$$CVRR = (\text{standard deviation of } R\text{-}R \text{ intervals/average value of } R\text{-}R \text{ intervals}) \times 100$$

In a case where driver's myoelectric information is acquired from the wearable devices (for example, a wrist watch type wearable device) attached to the body of the driver via the communication unit 11, the physical state recognition unit 35 may further recognize the driver's myoelectricity as the physical state of the driver. The ECU 20 is not needed to necessarily include the physical state recognition unit 35.

The driving readiness estimation unit 36 estimates the driving readiness based on the physical state of the driver recognized by the physical state recognition unit 35. In a case of the state of the driving position in which the driver is gripping the steering wheel while stretching back muscle, the driving readiness estimation unit 36 estimates that the driving readiness is large compared to the case of the a hand-departed state in which the hands are departed from the steering wheel or in a case of the state of a rest position in which the driver is deeply leaning the driver's seat.

The driving readiness estimation unit 36 estimates the driving readiness from the driver's reaction to the travelling environment based on the travelling environment recognized by the travelling environment recognition unit 22 and the physical state of the driver recognized by the physical state recognition unit 35. In a case where the vehicle is in a travelling scene (travelling environment) of entering an intersection, when the driver is in a state of checking the right and left sides while temporarily leaning forward, the driving readiness estimation unit 36 estimates that the driving readiness is high compared to a case where the driver is not in a state of leaning forward because it is considered that the driver takes a reaction to the travelling environment while having the driving consciousness.

Here, the driving readiness estimation unit 36 may determine whether or not the travelling environment of the vehicle is included in a predetermined travelling environments considered to give a tension to the driver such as a travelling environment in which the vehicle is travelling on a narrow road having a road width equal to or smaller than a predetermined value, a travelling environment in which the vehicle is travelling on a high place having a height equal to or greater than a predetermined value, or a travelling environment in which the vehicle-to-vehicle distance between the vehicle and a preceding vehicle and following vehicles is equal to or smaller than a predetermined value. These predetermined travelling environments are referred to as a tension travelling environment.

The travelling environment recognition unit 22 may determine whether or not the travelling environment of the vehicle is the tension travelling environment.

When it is determined that the body of the driver is in a stiffening state in a case where the travelling environment of the vehicle is the tension travelling environment, the driving readiness estimation unit 36 may estimate that the driving readiness is high compared to a case where the driver is not in a stiffening state because it is considered that the driver takes a reaction to the travelling environment while having the driving consciousness.

The driving readiness estimation unit 36 may estimate the driving readiness based on the travelling environment and the driver's grip pressure on the steering wheel. In a case where the travelling environment of the vehicle is the tension travelling environment when the driver's grip pressure on the steering wheel is equal to or greater than the grip pressure threshold value, the driving readiness estimation unit 36 may estimate that the driving readiness is high compared to a case where the driver's grip pressure on the steering wheel is smaller than the grip pressure threshold value because it is considered that the driver takes a reaction to the travelling environment while having the driving consciousness. The grip pressure threshold value is a value set in advance.

The driving readiness estimation unit 36 may perform the determination using the gap distance between the fingers of the hands in addition to the grip pressure. in a case where the travelling environment of the vehicle is the tension travelling environment, when the driver's the gap distance between the fingers of the hands is smaller than a gap threshold value, the driving readiness estimation unit 36 may estimate that the driving readiness is high compared to a case where the gap distance between the fingers of the hands is equal to or greater than the gap threshold value. In addition, a change of the grip pressure per unit time may be used instead of the grip pressure. In a case where the driver recognizes the travelling environment and is in tension state, it is considered that the change of the grip pressure per unit time becomes small.

Similarly, the driving readiness estimation unit 36 may estimate the driving readiness based on the travelling environment and the driver's pressing pressure on the armrest. In a case where the travelling environment of the vehicle is the tension travelling environment, when the driver's pressing pressure on the armrest equal to or greater than a pressing pressure threshold value, the driving readiness estimation unit 36 may estimate that the driving readiness is high compared to a case where the driver's pressing pressure on the armrest is smaller than the pressing pressure threshold value.

The driving readiness estimation unit 36 may estimate the driving readiness based on the travelling environment and the variations in the heart rate (CVRR). In a case where the travelling environment of the vehicle is the tension travelling environment, when the driver's CVRR is smaller than a CVRR threshold value, the driving readiness estimation unit 36 may estimate that the driving readiness is high compared to a case where the CVRR is equal to or greater than the CVRR threshold value because it is considered that the driver recognizes the travelling environment and the variations in the heart rate is reduced due to the tension.

It is known that, when a human gets the tension, a power of HF in a high frequency component (0.15 to 0.4 Hz) of the variations in the heart rate decreases and a power of LF in a low frequency component (0.05 to 0.15 Hz) increases. In a case where the travelling environment of the vehicle is the tension travelling environment, when the HF is smaller than a HF threshold value and the LF is equal to or higher than the LF threshold value, the driving readiness estimation unit 36 may estimate that the driving readiness is high compared to a case where the HF is not smaller than the HF threshold value or the LF is not equal to or higher than the LF threshold value.

The driving readiness estimation unit 36 may estimate the driving readiness based on the travelling environment and the electromyography. In a case where the travelling environment of the vehicle is the tension travelling environment, when an amplitude amount of the electromyography is equal to or greater than an electromyograph threshold value, the driving readiness estimation unit 36 may estimate that the driving readiness is high compared to the case amplitude amount of the electromyography is smaller than the electromyograph threshold value because it is considered that the driver recognizes the travelling environment and the electromyograph takes a reaction.

In a case where the travelling environment of the vehicle is the tension travelling environment, when an output of the electromyography of a antagonist muscle (for example, an upper arm biceps muscle and an upper arm triceps muscle) from an upper arm to a fore-arm is equal to or greater than a antagonist muscle threshold value, the driving readiness estimation unit 36 may estimate that the driving readiness compared to a case where the output of the electromyography of a antagonist muscle is smaller than the antagonist muscle threshold value because it is considered that the driver recognizes the travelling environment and the electromyograph takes a reaction. A lower leg antagonist muscle (for example, a tibialis and a dorsoventral muscle) can be similarly used for estimating the driving readiness of the driver instead of the arm.

The driving readiness estimation unit 36 may estimate the driving readiness based on the travelling environment and the brain wave recognized by the head state recognition unit 34. In a case where the travelling environment of the vehicle is the tension travelling environment, when the driver's α wave is smaller than an α threshold value, the driving readiness estimation unit 36 may estimate that the driving readiness is high compared to a case where the driver's α wave is equal to or greater than the α threshold value because it is considered that the driver recognizes the travelling environment and the brain wave takes a reaction.

In a case where the travelling environment of the vehicle is the tension travelling environment, when the driver's β wave is equal to or greater than a β threshold value, the driving readiness estimation unit 36 may estimate that the driving readiness is high compared to a case where the driver's β wave is smaller than the β threshold value because it is considered that the driver recognizes the travelling environment and the brain wave takes a reaction.

In a case where the vehicle is in a travelling scene of lane changing or merging (travelling environment), when the driver's θ wave is equal to or greater than a θ threshold value, the driving readiness estimation unit 36 may estimate that the driving readiness is high compared to a case where the driver's θ wave is smaller than the θ threshold value because it is considered that the driver recognizes the travelling environment and the brain wave takes a reaction (improvement in a concentration power).

Here, the ECU 20 may store driver's personal brain wave patterns to take the reactions to specific travelling environment (discovery of a red signal, lighting of a brake lamp of the preceding vehicle, discovery of an interrupting vehicle, and an appearance of a hurrying pedestrian). When a case where the driver's brain wave pattern corresponding to the travelling environment recognized by the travelling environment recognition unit 22 is recognized, the driving readiness estimation unit 36 may estimate that the driving readiness is high compared to a case Where the brain wave is not recognized because it is considered that the driver recognizes the travelling environment and the brain wave takes a reaction. The recognition of the brain wave patterns can be performed using a known method. A visual event-related potential or an eye retention-related potential can be used as the brain wave.

In addition, in a case of the travelling acne in which the vehicle enters the intersection, when the head state recognition unit 34 determines that the driver is checking right and left sides while facing toward the right and left direction, the driving readiness estimation unit 36 may estimate that the driving readiness is high compared to a ease where the driver does not check the right and left side because it is considered that the driver takes a reaction to the travelling environment while having the driving consciousness.

In a case of the travelling scene in which the vehicle is performing the lane change or merging, when the head state recognition unit 34 determines that the driver is checking the adjacent lanes in the rear direction while turning around his face, the driving readiness estimation unit 36 may estimate that the driving readiness is high compared to a case where driver does not cheek the rear direction because it is considered that the driver takes a reaction to the travelling environment while having the driving consciousness.

Figure 9:
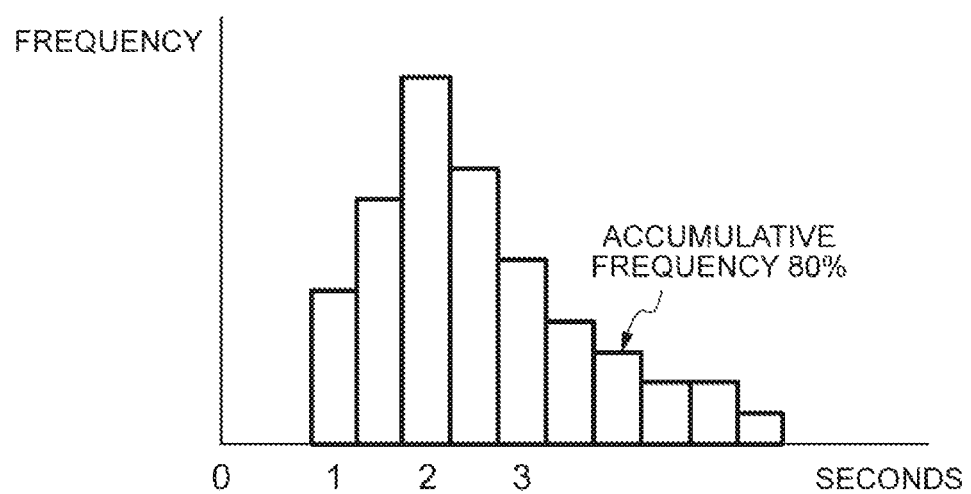
FIG. 9 is a graph illustrating a frequency distribution of a continuous inattentive time per one minute.

In addition, the driving readiness estimation unit 36 may estimate the driving readiness using the driver's continuous inattentive time based on the inattentiveness of the driver recognized by the head state recognition unit 34. FIG. 9 is a graph illustrating a frequency distribution of a continuous inattentive time per one minute. The vertical axis in FIG. 9 represents the frequency and the horizontal axis represents the time (seconds). Generally, the driver's continuous inattentive time shows a tendency illustrated in FIG. 9. Therefore, an accuracy of estimating the driving readiness of the driver is improved by using an accumulative frequency 80% tile in which the changes of frequency of the continuous inattentive time is larger than that in the accumulative frequency 50% tile (average value) in the graph illustrated FIG. 9. In estimating the driving readiness of the driver, the driving readiness estimation unit 36 may use a value obtained by multiplying the inverse of the frequency of the accumulative frequency 80% tile of the continuous inattentive time by a predetermined coefficient.

In addition, in a case where a driver's operation of an information terminal (a smart phone or the like) is recognized, the driving readiness estimation unit 36 may estimate that the driving readiness is low compared to the case where the driver's operation of an information terminal is not recognized. In a case where the driver matches the direction of his face toward the direction of the extending direction of the road within a predetermined time to follow the extending direction of the road as a reaction to a change (for example, a change to another direction from any of the front direction, left direction, right direction) of the extending direction of the road on which the vehicle is travelling, the driving readiness estimation unit 36 may estimate that the driving readiness is high compared to a case where the driver does not matches the direction of his face.

In addition, in a case where the driver is queried about a content of road traffic sign or the vehicle number of the preceding vehicle via the HMI 6 and the driver's answer is correct, the driving readiness estimation unit 36 may estimate that the driving readiness is high compared to a case where the driver's answer is not correct.

Figure 10A:
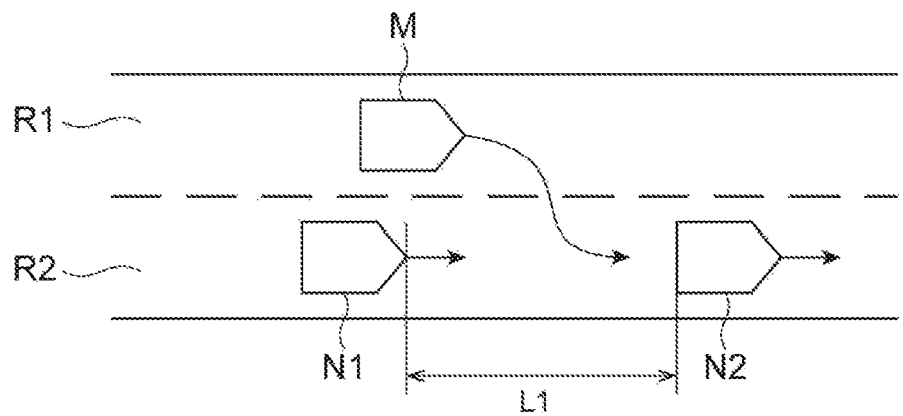
FIG. 10A is a plan view illustrating a scene of a vehicle changing a lane.

The driving task demand estimation unit 37 may estimate the driving task demand using both the travelling environment and the vehicle state. FIG. 10A is a plan view illustrating a scene of a vehicle changing the lane. In FIG. 10A, a vehicle (a host vehicle) M, a travelling lane R1 in which the vehicle M is travelling, an adjacent lane R2, another vehicle N1 and another vehicle N2 travelling in the adjacent lane R2, and a vehicle-to-vehicle distance L1 between another vehicle N1 and another vehicle N2 are illustrated. The vehicle M is performing the lane change between another vehicle N1 and another vehicle N2. In this situation, the driving task demand estimation unit 37 may estimate the driving task demand using Equation (1) below.

Driving task demand=constant γ1×√((vehicle speed of another vehicle $N2$−vehicle speed of vehicle $M)^2$)+constant γ2×1/(vehicle-to-vehicle distance $L1$ between another vehicles $N1$ and $N2$) (1)

Figure 10B:
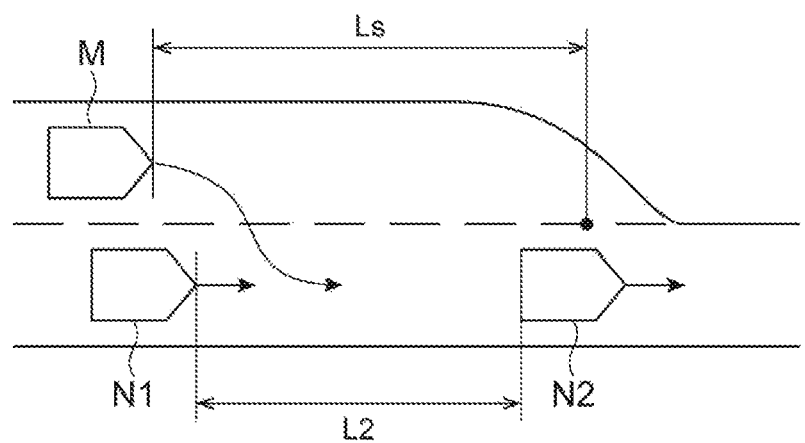
FIG. 10B is a plan view illustrating a scene of a vehicle merging to a merging lane.

FIG. 10B is a plan view illustrating a scene of the vehicle merging to the merging lane. In FIG. 10B, a distance Ls from the vehicle M to a merging section end point and a vehicle-to-vehicle distance L2 between another vehicle N1 and another vehicle N2. The vehicle M is trying to join between another vehicle N1 and another vehicle N2. In this situation, the driving task demand estimation unit 37 may estimate the driving task demand using Equation (2) below.

Driving task demand=(constant δ1×√((vehicle speed of another vehicle $N2$−vehicle speed of vehicle $M)^2$)+constant δ2×1/(vehicle-to-vehicle distance $L2$ between another vehicles $N1$ and $N2$))×constant δ3(1/(distance $Ls$/vehicle speed of vehicle $M$)) (2)

In addition, the driving task demand estimation unit 37 may estimate the driving task demand based on the situation of the obstacles around the vehicle. That is, the driving task demand estimation unit 37 can estimate the driving task demand using Equation (3) below.

Driving task demand=constant ε1×(1/longitudinal TTC between obstacle and vehicle)×constant ε2×(1/lateral distance between obstacle and vehicle)×constant ε3(lateral speed of obstacle) (3)

The longitudinal means a front and rear direction of the vehicle and the lateral means the vehicle width direction.

In a case where desity information of pedestrians (including bicycles) in an area where the vehicle positions (for example, an area of 200 m×200 m on the map) is received via the wireless communication with an information management center through the communication unit 11, the driving task demand estimation unit 37 may estimate the driving task demand based on the density information. The driving task demand estimation unit 37 may calculate a pedestrian encounter predicted value in the area where the vehicle positions from the density information using a known method, and then, may use the value obtained by multiplying the pedestrian encounter predicted value by a constant as the driving task demand.

In addition, using the time to collision between the vehicle and the preceding vehicle, the driving task demand estimation unit 37 may estimate that a value obtained by multiplying the reverse value of the time to collision by a constant is the driving task demand. The driving task demand estimation unit 37 degree may estimate that a value obtained by multiplying the maximum value of the yaw rate of the vehicle for each predetermined time by a constant is the driving task demand. The driving task demand estimation unit 37 degree may estimate that a value obtained by multiplying the maximum value of the steering angular velocity of the vehicle for each predetermined time by a constant is the driving task demand.

In a case where plural travelling environments overlap (travelling on curve+the obstacle and the like), the driving task demand estimation unit 37 may estimate an overall driving task demand by adding the values calculated using the methods described above.

According to the driving consciousness estimation device 200 in the modification example described above, it is possible to improve the accuracy of estimation by estimating the driving readiness and the driving task demand using various methods.

In addition, the driving consciousness estimation devices 100 and 200 do not need to necessarily calculate the margin. The driving consciousness estimation devices 100 and 200 may execute awakening of the attention based on the result of comparison between the driving readiness and the driving task demand. Similarly, the driving consciousness estimation devices 100 and 200 may determine whether or not the driver is in the manual driving possible situation based on the result of comparison between the driving readiness and the driving task demand.

Figure 11:
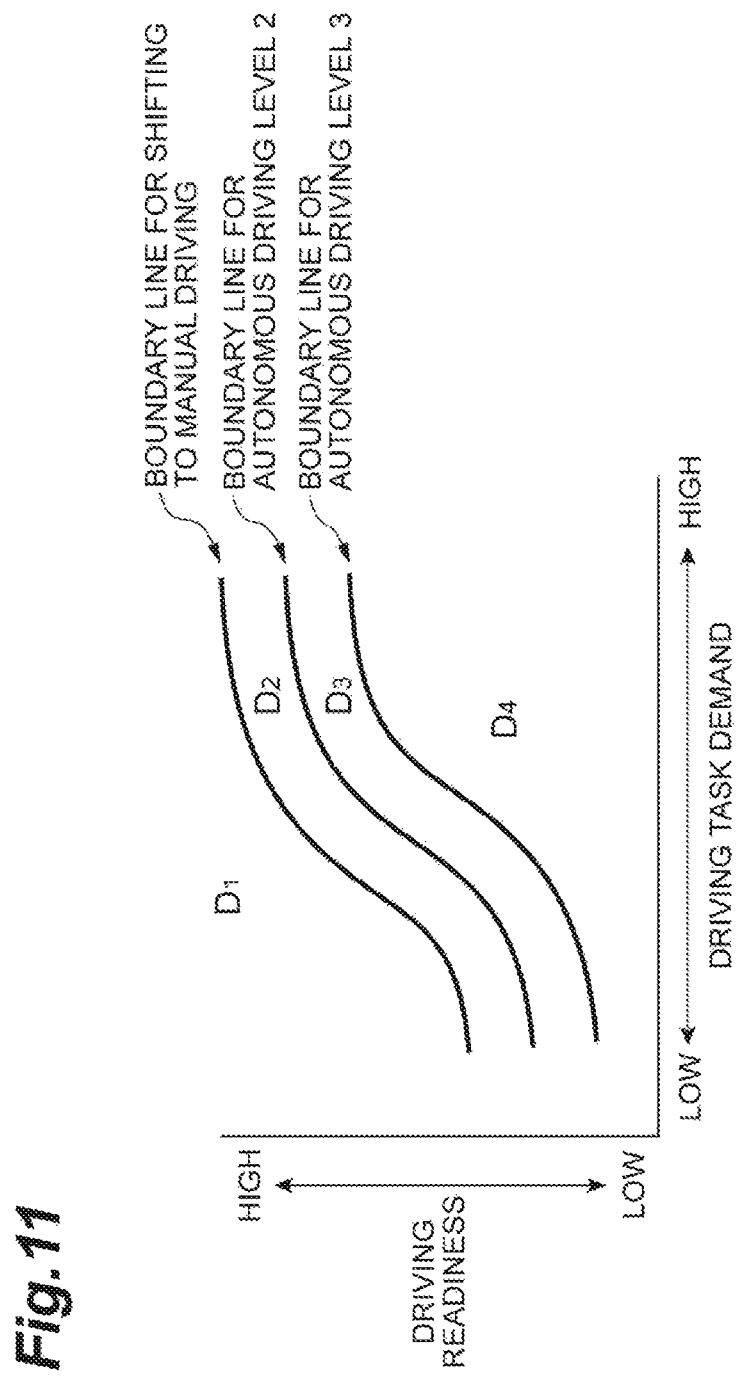
FIG. 11 is a graph illustrating relationships between the driving readiness and a driving task demand, and a determination result.

FIG. 11 is a graph illustrating relationships between the driving readiness and a driving task demand, and a determination result. The vertical axis represents the driving readiness and the horizontal axis represents the driving task demand. In FIG. 11, a boundary line for shifting to the manual driving, a boundary line for the autonomous driving level 2, and a boundary line for the autonomous driving level 3 are illustrated. The boundary line for shifting to the manual driving corresponds to the threshold value for shifting to the manual driving in FIG. 7 using the margin. The boundary line for the autonomous driving level 2 corresponds to the margin threshold value in the autonomous driving level 2 in FIG. 7. The boundary line for the autonomous driving level 3 corresponds to the margin threshold value in the autonomous driving level 3 in FIG. 7. D1 is an area where the driving readiness is higher than that on the boundary line for shifting to the manual driving. D2 is an area between the boundary line for shifting to the manual driving and the boundary line for the autonomous driving level 2. D3 is an area between the boundary line for the autonomous driving level 2 and the boundary line for the autonomous driving level 3.

The attention awakening unit 28 can execute awakening of the attention from the result of comparison between the driving readiness and the driving task demand using, for example, the relationships illustrated in FIG. 11 set in advance without using the margin. In a case where the autonomous driving of the autonomous driving level 2 is executed in the vehicle, when the estimated driving readiness and the driving task demand are plotted on FIG. 11 and the plotted dots are included in the area of D3 or D4, the attention awakening unit 28 executes the attention awakening. In a case where the autonomous driving of the autonomous driving level 3 is executed in the vehicle, when the estimated driving readiness and the driving task demand are plotted on FIG. 11 and the plotted dots are included in the area of D4, the attention awakening unit 28 executes the attention awakening.

When the estimated driving readiness and the driving task demand are plotted on FIG. 11 and the plotted dots are included in the area of D1, the manual driving possibility determination unit 29 determines that the driver is in the manual driving possible situation. When the estimated driving readiness and the driving task demand are plotted on FIG. 11 and the plotted dots are included in the areas of D2 to D4, the manual driving possibility determination unit 29 determines that the driver is not in the manual driving possible situation.

In addition, the ECUs 20 and 30 in the driving consciousness estimation devices 100 and 200 do not need to necessarily connected to the autonomous drive ECU 7. The present invention can be applied to a vehicle that does not execute the autonomous driving.

What is claimed is:

1. A driving consciousness estimation device comprising:
   a driver image acquisition unit configured to acquire a driver image in which a driver of a vehicle is imaged;
   a travelling environment recognition unit configured to recognize a travelling environment around the vehicle;
   a driving readiness estimation unit configured to estimate a driving readiness relating to a driving consciousness of the driver from a driver's reaction to the travelling environment based on the driver image and the travelling environment;
   a driving task demand estimation unit configured to estimate a driving task demand;
   a margin calculation unit configured to calculate a result of comparison between a value of the driving readiness and a value of the driving task demand as a margin; and
   an attention awakening unit configured to execute awakening of attention for the driver relating to the driving of the vehicle,
   wherein the vehicle is capable of autonomous driving by shifting between a plurality of autonomous driving levels, the levels of autonomous driving being defined according to a degree of autonomous driving,
   wherein the driving readiness is a degree of height of the driving consciousness of the driver,
   wherein the driving task demand is calculated based on at least one of the following:
      a vehicle speed of the vehicle,
      time to collision between the vehicle and a preceding vehicle, and
      a curvature of a road that the vehicle is traveling,
   wherein the driving task demand is a required driving readiness required from the traveling environment,
   wherein, in a case where the margin is smaller than a margin threshold value, the attention awakening unit is configured to execute awakening of the attention, and
   wherein the higher the executed autonomous driving level is in the vehicle, the smaller the margin threshold value used.

2. The driving consciousness estimation device according to claim 1, further comprising:
   a manual driving possibility determination unit configured to determine whether or not the driver is in a manual driving possible situation based on the result of comparison between the driving readiness and the driving task demand when an autonomous driving electronic control unit (ECU) of the vehicle ends the autonomous driving.

3. The driving consciousness estimation device according to claim 1,
   wherein the driving readiness estimation unit is configured to calculate the number of saccades of eye balls per a predetermined time interval during a period when the driver is facing the extending direction of the road on which the vehicle is travelling based on the driver image and the travelling environment, and estimate the driving readiness based on the number of saccades.

4. The driving consciousness estimation device according to claim 3, further comprising:
   a manual driving possibility determination unit configured to determine whether or not the driver is in a manual driving possible situation based on the result of comparison between the driving readiness and the driving task demand when an autonomous driving electronic control unit (ECU) of the vehicle ends the autonomous driving.

5. A driving consciousness estimation device comprising:
   a driver image acquisition unit configured to acquire a driver image in which a driver of a vehicle is imaged;
   a travelling environment recognition unit configured to recognize a travelling environment around the vehicle;
   a vehicle state recognition unit configured to recognize a travelling state of the vehicle;
   a driving readiness estimation unit configured to estimate a driving readiness relating to a driving consciousness of the driver from a driver's reaction to the vehicle state based on the driver image and the vehicle state;
   a driving task demand estimation unit configured to estimate a driving task demand;
   a margin calculation unit configured to calculate a result of comparison between a value of the driving readiness and a value of the driving task demand as a margin; and
   an attention awakening unit configured to execute awakening of attention for the driver relating to the driving of the vehicle,
   wherein the vehicle is capable of autonomous driving by shifting between a plurality of autonomous driving levels, the levels of autonomous driving being defined according to a degree of autonomous driving,
   wherein the driving readiness is a degree of height of the driving consciousness of the driver, wherein the driving task demand is calculated based on at least one of the following:
a vehicle speed of the vehicle,
time to collision between the vehicle and a preceding vehicle, and
a curvature of a road that the vehicle is traveling,
wherein the driving task demand is a required driving readiness required from the traveling environment,
wherein, in a case where the margin is smaller than a margin threshold value, the attention awakening unit is configured to execute awakening of the attention, and
wherein the higher the executed autonomous driving level is in the vehicle, the smaller the margin threshold value used.

6. The driving consciousness estimation device according to claim 5, further comprising:
a manual driving possibility determination unit configured to determine whether or not the driver is in a manual driving possible situation based on the result of comparison between the driving readiness and the driving task demand when an autonomous driving electronic control unit (ECU) of the vehicle ends the autonomous driving.

7. The driving consciousness estimation device according to claim 5,
wherein the vehicle state recognition unit is configured to recognize a longitudinal acceleration of the vehicle as the vehicle state, and
wherein the driving readiness estimation unit is configured to estimate the driving readiness from a head pitch angle of the driver with respect to the longitudinal acceleration of the vehicle based on the driver image and the longitudinal acceleration of the vehicle.

8. The driving consciousness estimation device according to claim 7, further comprising:
a manual driving possibility determination unit configured to determine whether or not the driver is in a manual driving possible situation based on the result of comparison between the driving readiness and the driving task demand when an autonomous driving electronic control unit (ECU) of the vehicle ends the autonomous driving.

\* \* \* \* \*